US006915379B2

(12) United States Patent
Honda et al.

(10) Patent No.: US 6,915,379 B2
(45) Date of Patent: Jul. 5, 2005

(54) STORAGE DEVICE FOR PROCESSING AN ACCESS REQUEST FROM A HOST AND STORAGE SYSTEM INCLUDING STORAGE DEVICES

(75) Inventors: Kiyoshi Honda, Yokohama (JP); Atsushi Takayasu, Oiso (JP); Eisaku Saiki, Yokohama (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 181 days.

(21) Appl. No.: 10/082,303

(22) Filed: Feb. 26, 2002

(65) Prior Publication Data

US 2002/0178328 A1 Nov. 28, 2002

(30) Foreign Application Priority Data

May 23, 2001 (JP) ...................................... 2001-153345
Nov. 9, 2001 (JP) ...................................... 2001-344010

(51) Int. Cl.[7] .............................................. G06F 12/00
(52) U.S. Cl. .......................................... 711/114; 714/6
(58) Field of Search ................................ 711/112, 113, 711/114, 111; 714/6

(56) References Cited

U.S. PATENT DOCUMENTS 5,432,922 A * 7/1995 Polyzois et al. ............... 714/6
5,583,876 A * 12/1996 Kakuta ....................... 714/766
5,768,623 A * 6/1998 Judd et al. .................... 710/37

FOREIGN PATENT DOCUMENTS

| JP | 7-281959 | 10/1995 | |
| JP | 10-74129 | 3/1998 | |
| JP | 10171559 A | * 6/1998 | ............. G06F/1/26 |
| KR | 1998-014208 | 5/1998 | |

OTHER PUBLICATIONS

D.A. Patterson et al, "A Case for Redundant Arrays of Inexpensive Disks (RAID) ", Proceedings of ACM SIGMOD, 1988.

* cited by examiner

Primary Examiner—Matthew Kim
Assistant Examiner—Hetul Patel
(74) Attorney, Agent, or Firm—Mattingly, Stanger, Malur & Brundidge, P.C.

(57) ABSTRACT

A control method which is used in a RAID1 storage subsystem including a plurality of storage devices, and processes an access request from a host computer with the cooperation of the plurality of storage devices of the storage subsystem is provided. In the storage subsystem, each storage device of the RAID1 storage subsystem includes a unit for sharing an access request from the host computer, and a unit for determining if the storage device should process the shared access request. The storage device further includes a unit for transferring write data, which is transmitted from the host computer to the storage subsystem, to at least a storage device that should process it.

6 Claims, 33 Drawing Sheets

FIG. 16

| COOPERATION CONTROL INFORMATION ITEM | | EXAMPLE OF SETTING FOR STORAGE DEVICE #1 | EXAMPLE OF SETTING FOR STORAGE DEVICE #2 |
|---|---|---|---|
| STORAGE SYSTEM ID (SHARED ID) | | ID_0 | ID_0 |
| STORAGE DEVICE ID (UNIQUE ID) | | ID_1 | ID_2 |
| COOPERATION STORAGE DEVICE ID (ID UNIQUE TO COOPERATION STORAGE DEVICE) | | ID_2 | ID_1 |
| COOPERATION PROCESSING (COMMAND TRANSFER) MODE | | COMMAND RETRANSMISSION | COMMAND RECEPTION |
| AREA MANAGEMENT INFORMATION | COOPERATION PROCESSING AREA | 0- (N-1) | 0- (N-1) |
| | ACTIVE AREA START ADDRESS | 0 | N / 2 |
| | ACTIVE AREA SIZE | N / 2 | N / 2 |

FIG. 17

| BYTE \ BIT | 7 | 6 | 5 | 4 | 3 | 2 | 1 | 0 |
|---|---|---|---|---|---|---|---|---|
| 0-7 | FCP_LUN | | | | | | | |
| 8 | COMMAND REFERENCE NUMBER | | | | | | | |
| 9 | RESERVED | | | | TASK ATTRIBUTE | | | |
| 10 | TASK MANAGEMENT FLAGS | | | | | | | |
| 11 | RESERVED | | | | | | RD DATA | WR DATA |
| 12 | OPERATION CODE | | | | | | | |
| 13 | LOGICAL UNIT NUMBER | | | FLAG | | | | |
| 14-17 | LOGICAL BLOCK ADDRESS | | | | | | | |
| 18 | RESERVED | | | | | | | |
| 19-20 | TRANSFER LENGTH | | | | | | | |
| 21 | CONTROL | | | | | | | |
| 22-27 | RESERVED | | | | | | | |
| 28-31 | FCP_DL | | | | | | | |

FIG. 18

| WORD\BYTE | 3 | 2 | 1 | 0 |
|---|---|---|---|---|
| 0 | R_CTL | D_ID | | |
| 1 | CS_CTL | S_ID | | |
| 2 | TYPE | F_CTL | | |
| 3 | SEQ_ID | SEQ_ID | SEQ_CNT | |
| 4 | OX_ID | | RX_ID | |
| 5 | PARAMETER | | | |

FIG. 19

| # | HOST ID (S_ID) | OX_ID | RX_ID |
|---|---|---|---|
| 0 | ID_3 | OX_00 | RX_00 |
| 1 | ID_3 | OX_01 | RX_02 |
| 2 | ID_4 | OX_01 | RX_04 |
| . | — | — | — |
| N | — | — | — |

FIG. 22

| COOPERATION CONTROL INFORMATION ITEM | | STORAGE DEVICE #1 | STORAGE DEVICE #2 | STORAGE DEVICE #N |
|---|---|---|---|---|
| STORAGE SYSTEM ID (SHARED ID) | | ID_0 | ← | ← |
| STORAGE DEVICE ID (UNIQUE ID) | | ID_1 | ID_2 | ID_N |
| POSITION MAP | | 1 | 2 | N |
| COMMAND TRANSFER MODE | | RECEPTION & RETRANSMISSION | RECEPTION & RETRANSMISSION | RECEPTION ONLY |
| REDUNDANT CONFIGURATION MANAGEMENT INFORMATION | RAID LEVEL | 5 | ← | ← |
| | NO. OF DATA DISKS | N-1 | ← | ← |
| | NO. OF REDUNDANT DATA DISKS | 1 | ← | ← |
| | REDUNDANT DATA MANAGEMENT SIZE | 64 (kB) | ← | ← |

FIG. 23

| SOF | HEADER | PAYLOAD | CRC | EOF |

FIG. 24

| WORD\BYTE | 3 | 2 | 1 | 0 |
|---|---|---|---|---|
| 0 | R_CTL | D_ID | | |
| 1 | CS_CTL | S_ID | | |
| 2 | TYPE | F_CTL | | |
| 3 | SEQ_ID | SEQ_ID | SEQ_CNT | |
| 4 | OX_ID | | RX_ID | |
| 5 | PARAMETER | | | |

FIG. 25

| BYTE\BIT | 7 | 6 | 5 | 4 | 3 | 2 | 1 | 0 |
|---|---|---|---|---|---|---|---|---|
| 0-7 | FCP_LUN | | | | | | | |
| 8 | COMMAND REFERENCE NUMBER | | | | | | | |
| 9 | RESERVED | | | | TASK ATTRIBUTE | | | |
| 10 | TASK MANAGEMENT FLAGS | | | | | | | |
| 11 | RESERVED | | | | | | RD DATA | WR DATA |
| 12 | OPERATION CODE | | | | | | | |
| 13 | LOGICAL UNIT NUMBER | | | | FLAG | | | |
| 14-17 | LOGICAL BLOCK ADDRESS | | | | | | | |
| 18 | RESERVED | | | | | | | |
| 19-20 | TRANSFER LENGTH | | | | | | | |
| 21 | CONTROL | | | | | | | |
| 22-27 | RESERVED | | | | | | | |
| 28-31 | FCP_DL | | | | | | | |

FIG. 29

| BYTE\BIT | 7 | 6 | 5 | 4 | 3 | 2 | 1 | 0 |
|---|---|---|---|---|---|---|---|---|
| 0-X | \multicolumn{8}{c|}{DATA_VALID BIT} |
| - | \multicolumn{8}{c|}{USER (READ/WRITE) DATA SEGMENT 0} |
| - | \multicolumn{8}{c|}{:} |
| - | \multicolumn{8}{c|}{USER (READ/WRITE) DATA SEGMENT n} |

FIG. 34

| COOPERATION CONTROL INFORMATION ITEM | | STORAGE DEVICE #1 | STORAGE DEVICE #2 | STORAGE DEVICE #N |
|---|---|---|---|---|
| STORAGE SYSTEM ID (SHARED ID) | | ID_0 | ← | ← |
| STORAGE DEVICE ID (UNIQUE ID) | | ID_1 | ID_2 | ID_N |
| POSITION MAP | | 1 | 2 | N |
| COMMAND TRANSFER MODE | | RECEPTION & RETRANSMISSION | RECEPTION & RETRANSMISSION | RECEPTION ONLY |
| REDUNDANT CONFIGURATION MANAGEMENT INFORMATION | RAID LEVEL | 5 | ← | ← |
| | NO. OF DATA DISKS | 3 | ← | ← |
| | NO. OF REDUNDANT DATA DISKS | 1 | ← | ← |
| | REDUNDANT DATA MANAGEMENT SIZE | 64 (kB) | ← | ← |
| | OPERATION MODE (NORMAL/FALLBACK) | FALLBACK | ← | ← |
| | FAILING STORAGE DEVICE ID | ID_2 | ← | ← |

STORAGE DEVICE FOR PROCESSING AN ACCESS REQUEST FROM A HOST AND STORAGE SYSTEM INCLUDING STORAGE DEVICES

BACKGROUND OF THE INVENTION

The present invention relates to a storage subsystem in which data is stored. More particularly, the present invention relates to the cooperation control of a plurality of storage devices that form the storage subsystem in which duplicated data is stored. "A Case for Redundant Arrays of Inexpensive Disks (RAID)" (Proceedings of ACM SIGMOD, 1988) stipulates the classification of disk array devices, composed of a plurality of disk devices, according to the generation of redundant data and the storage method.

In the above technology, a disk array device is called RAID1 that stores duplicated data on two disk devices and that allows data to be read from or write to one of the disk devices even when an error occurs on the other disk device in the redundant configuration and data cannot be read from or written to that disk device.

In addition, JP-A-10-74129 (first prior art) discloses a technology that reduces the load on the write data transfer from the disk controller to the duplicated disk devices in the RAID1 disk array device described above to improve the processing performance of the disk controller.

According to the first prior art, the disk controller transfers write data only to the first disk device when writing data and the first disk device, in turn, transfers the write data to the second disk device not via the disk controller, eliminating the need for transferring write data from the disk controller to the second disk device.

In addition, JP-A-7-281959 (second prior art) discloses a method for connecting the two disk devices via a dedicated communication line to allow them to write data at the same time while communicating one another during the data write operation.

According to the second prior art, write data is transferred to the two disk devices at the same time. Therefore, the amount of write data on the interface is the same as that of write data when data is not duplicated.

The first prior art described above at least requires a disk controller that controls the disk devices of the disk array device and that has the means for issuing a special write command to the first disk device. This makes the disk array device expensive.

In addition, the prior art described above does not reduce the amount of write data transferred on the interface, that is, does not reduce the load on the interface between the disk controller and the disk devices. Therefore, the prior art does not prevent performance degradation caused by a conflict on the interface in the disk array device.

The second prior art eliminates the need for the disk controller that is the problem with the first prior art and prevents an increase in the amount of write data transferred on the interface. However, implementing this technology requires a dedicated communication line through which the disk devices communicate.

In addition, the two disk devices synchronize one another, or the master device monitors the operation progress of the slave device, to transfer write data. Therefore, a decrease in the disk device usage efficiency or an extra time required for writing data on one disk device degrades performance.

Furthermore, in the prior art described above, much attention is not paid to the method for switching between the first device and the second device or between the master device and the slave device, or to the disk device selection control method during data read processing.

SUMMARY OF THE INVENTION

It is an object of the present invention to provide a control method, for use in a RAID1 storage subsystem composed of a plurality of storage devices, for processing a data read/write request from a host computer with the cooperation of the plurality of storage devices of the storage subsystem, and to provide a storage subsystem that solves the problems described above through this control method.

The present invention may be applied also to a RAID system other than RAID1.

To achieve the above objects, the storage subsystem comprising RAID1, composed of a plurality of storage devices, has the configuration described below.

A storage device of the storage subsystem according to the present invention comprises means for receiving a request for information processing for the storage subsystem that is performed in a host computer, means for transferring the received request to a second storage device that is one of the plurality of storage devices, and means for executing information processing indicated by the received request when the first storage device should process the received request.

A storage device of the storage subsystem may also comprise at least means for sharing a write data request transmitted from a host computer to the storage subsystem and means for synchronously executing the transfer of write data between paired storage devices and the transmission of status information on the write data request.

Other objects, features and advantages of the invention will become apparent from the following description of the embodiments of the invention taken in conjunction with the accompanying drawings.

BRIEF DESCRIPTION OF THE DRAWINGS

FIG. 16 is a diagram showing an example of the configuration of cooperation control information according to the present invention.

FIG. 17 is a diagram showing an example of the configuration of access request information.

FIG. 18 is a diagram showing an example of the configuration of frame header information.

FIG. 19 is a diagram showing an example of the configuration of write processing management information according to the present invention.

FIG. 22 is a diagram showing an example of the configuration and setting of cooperation control information in the fourth embodiment of the present invention.

FIG. 23 is a diagram showing an example of the configuration of frame information used in the present invention.

FIG. 24 is a diagram showing an example of the configuration of header information included in the frame information used in the present invention.

FIG. 25 is a diagram showing an example of access request information included in the frame information used in the present invention.

FIG. 29 is a diagram showing an example of the configuration of data frame information in the present invention.

FIG. 34 is a diagram showing an example of the configuration and setting of cooperation control information in a fifth embodiment of the present invention.

DESCRIPTION OF THE EMBODIMENTS

A first embodiment of the present invention will be described with reference to the drawings.

Figure 1:
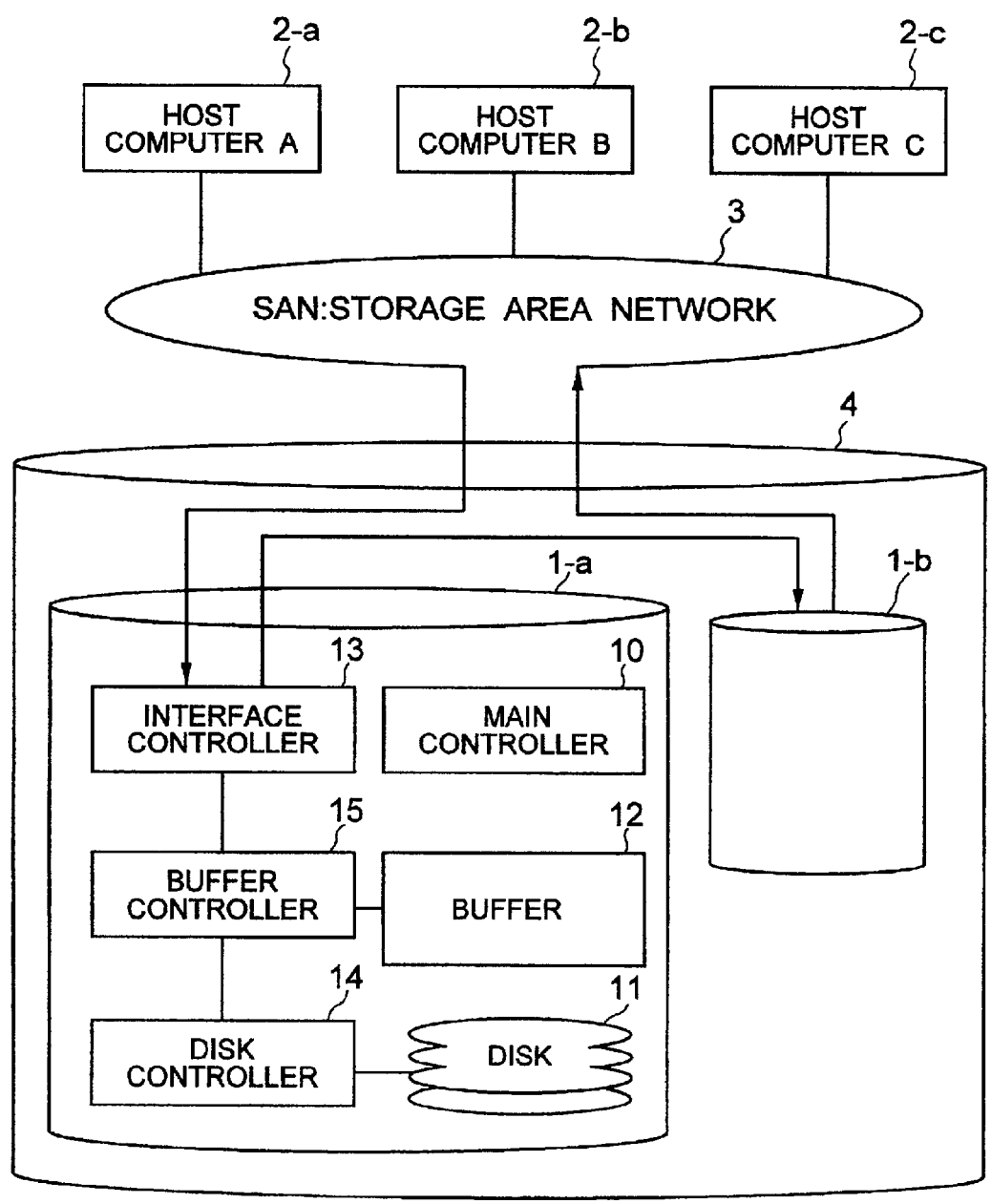
FIG. 1 is a diagram showing an example of the configuration of a data processing system according to the present invention.

FIG. 1 is a diagram showing an example of the configuration of a data processing system in which a storage subsystem 4 composed of two storage devices 1-*a/b* and a plurality of host computers 2 are connected via an interface (in this figure, SAN: Storage Area Network) 3.

In the configuration in the figure, a disk device is used as a storage device 1. Each of the disk devices 1-*a/b* comprises disks 11 that are storage media for storing data to be accessed by the host computers 2, a buffer 12 that temporarily stores data to be transferred between the disks 11 and the host computers 2, an interface controller 13 that controls the protocol of interface with the host computers 2, a disk controller 14 that records data to or reproduces data from the disks 11, a buffer controller 15 that controls access to the buffer 12, and a main controller 10 that controls all components.

In the figure, the disk devices 1-*a/b* store duplicated data to form the RAID1 storage subsystem.

Although the storage subsystem composed of two disk devices is shown as an example in the figure, the present invention is not limited to this configuration. The storage subsystem may contain three or more storage devices.

The first embodiment of the present invention will be described below with reference to FIGS. 2, 3, 4, 5, 6, 7, and 8. In this embodiment, each storage device has (or receives) a request and each storage device checks if the storage device should execute data processing corresponding to the request. This checking is made using cooperation control information 28.

In this embodiment, a plurality of storage devices 1 of the storage subsystem 4 share an access request transmitted from the host computers 2 to the storage subsystem 4 and, in addition, each storage device checks whether or not it should process the access request. This makes it possible a low-cost storage subsystem that eliminates the need for a controller controlling the individual storage devices and a high-performance storage subsystem that ensures optimum storage device usage efficiency.

Figure 2:
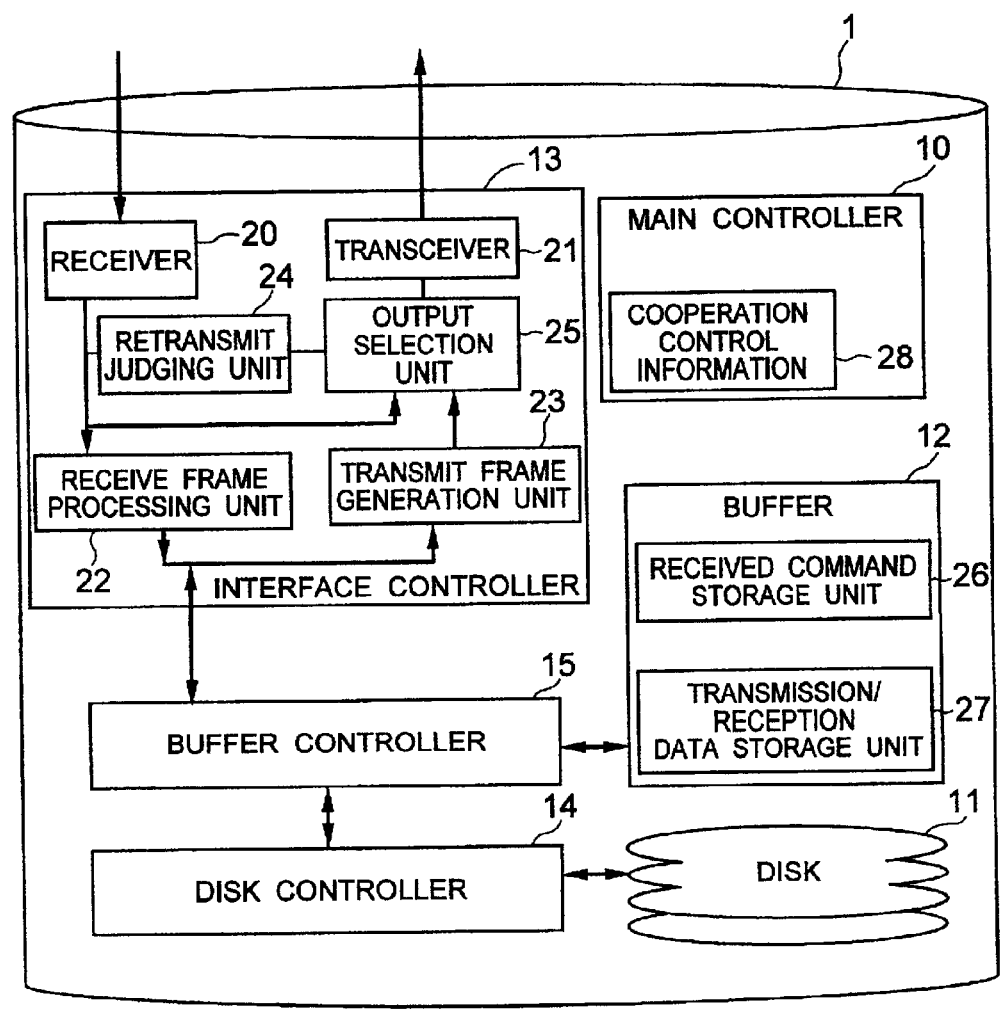
FIG. 2 is a diagram showing an example of the configuration of a storage device in a first embodiment of the present invention.

FIG. 2 is a diagram showing an example of the configuration of the storage device 1 included in the storage subsystem 4.

In the figure, the interface controller 13 comprises a receiver 20 that receives data via the interface 3, a transceiver 21 that transmits data in the same way, a receive frame processing unit 22 that checks information such as a received frame for an error or, when storing at least a part of the frame information in the buffer 12, controls where to store it, and a transmit frame generation unit 23 that generates additional information such as header information of frame information when transmitting data such as a frame.

The interface controller further comprises a retransmit judging unit 24 that checks if information, such as a frame received by the receiver 20, should be retransmitted to the device in the following stage and generates a retransmission control signal; and an output selection unit 25 that selects one of information from the transmit frame generation unit 23 and information received by the receiver 20 based on the retransmission control signal and outputs the selected data to the transceiver 21.

The buffer 12 comprises a received command storage unit 26 in which an access request (command) received from the host computers 2 is stored, and a transmission/reception data storage unit 27 in which data transmitted to or received from the host computers 2 is stored.

The main controller 10 stores cooperation control information 28 indicating an operation between a pair of disk devices. This information includes information indicating whether or not an access request from the host computers 2 to the storage subsystem 4 should be retransmitted to the device in the following stage, information indicating whether the device should process the access request, and so on. The detail of the cooperation control information 28 will be described later with reference to FIG. 16.

In addition, the retransmit judging unit 24 controls the retransmission of data such as frames transmitted from the host computers 2 to the storage subsystem 4. This unit controls the retransmission of an access request based on the cooperation control information 28, and the retransmission of write data based on the header information included in the frame of the write data.

The following describes an example of read/write data transfer processing in which each disk device checks if it should process an access request, transmitted from a host computer to the storage subsystem, based on an area requested by an access request.

Figure 3:
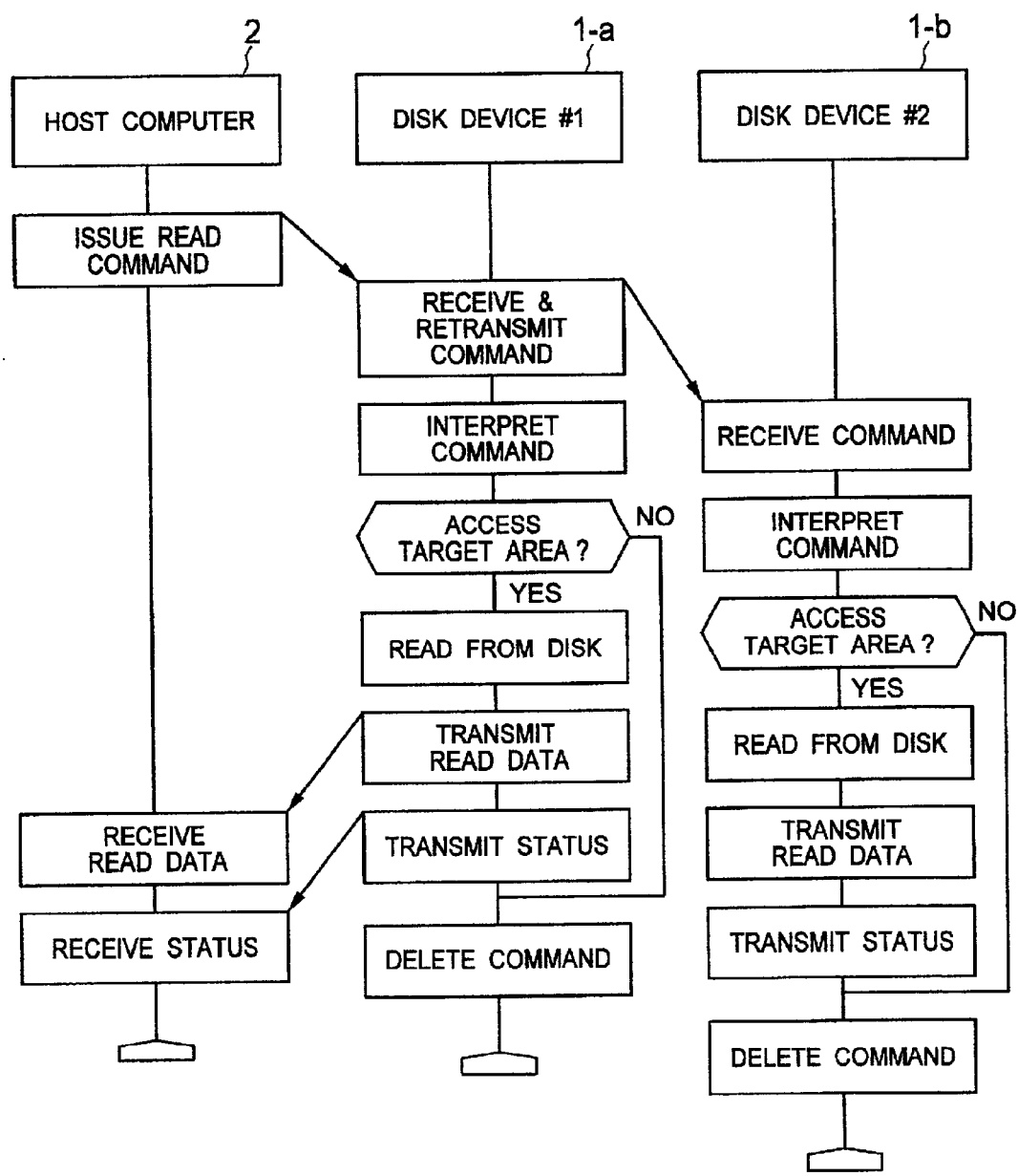
FIG. 3 is a diagram showing an example of the read processing flow in the first embodiment of the present invention.

FIG. 3 is a diagram showing the flow of processing executed by the devices when a read data request is issued from the host computers 2 to the storage subsystem 4 composed of the disk devices 1-a/b.
(1) Access Request (command) Reception and Retransmission A read data request issued from the host computers 2 to the storage subsystem 4 is received first via the receiver 20 of the disk device 1-a as frame information. The disk device 1-a stores the received read data request into the received command storage unit 26 of the buffer 12 via the receive frame processing unit 22.

The retransmit judging unit 24 of the disk device 1-a is set up by the cooperation control information 28 to retransmit the access request, transmitted from the host computers 2 to the storage subsystem 4, to the disk device 1-b in the following stage. Thus, the retransmit judging unit 24 finds that the received frame information is an access request, generates the retransmission control (indication) signal, and transmits the signal to the output selection unit 25. As a result, in response to the retransmission control (indication) signal, the selection unit 25 retransmits the read data request, transmitted from the host computer, to the disk device 1-b in the following stage.

The disk device 1-b stores the read data request, retransmitted by the disk device 1-a, into the received command storage unit 26 of the buffer 12 via the receive frame processing unit 22. The retransmit judging unit 24 of the disk device 1-b is set up by the cooperation control information 28 not to retransmit the access request to the device in the following stage.
(2) Access Request (command) Interpretation and Access Request (command) Execution Each of the disk devices 1-a/b interprets the access request stored in the received command storage unit 26 and finds that the access request is a read data request.

In addition, the disk device checks if the device should process the read data request based on the read request area information included in the read data request and the cooperation control information 28.

The device, which has judged that it will process the request, starts reading data from the disks 11 into the transmission/reception data storage unit 27 of the buffer 12 via the disk controller 14 and, in addition, transmits the read data to the host computer 2 via the interface controller 13. Then, after transmitting the read data, the disk device generates and transmits status information on the read data request and deletes the access request to complete a series of read data request processing.

On the other hand, the disk device, which has judged that it will not process the request, deletes the access request and completes the read data request processing.

Although an access request is transferred to the disk device 1-b via the disk device 1-a in this embodiment, the host computer 2 may transmit an access request directly to each disk device.

Figure 4:
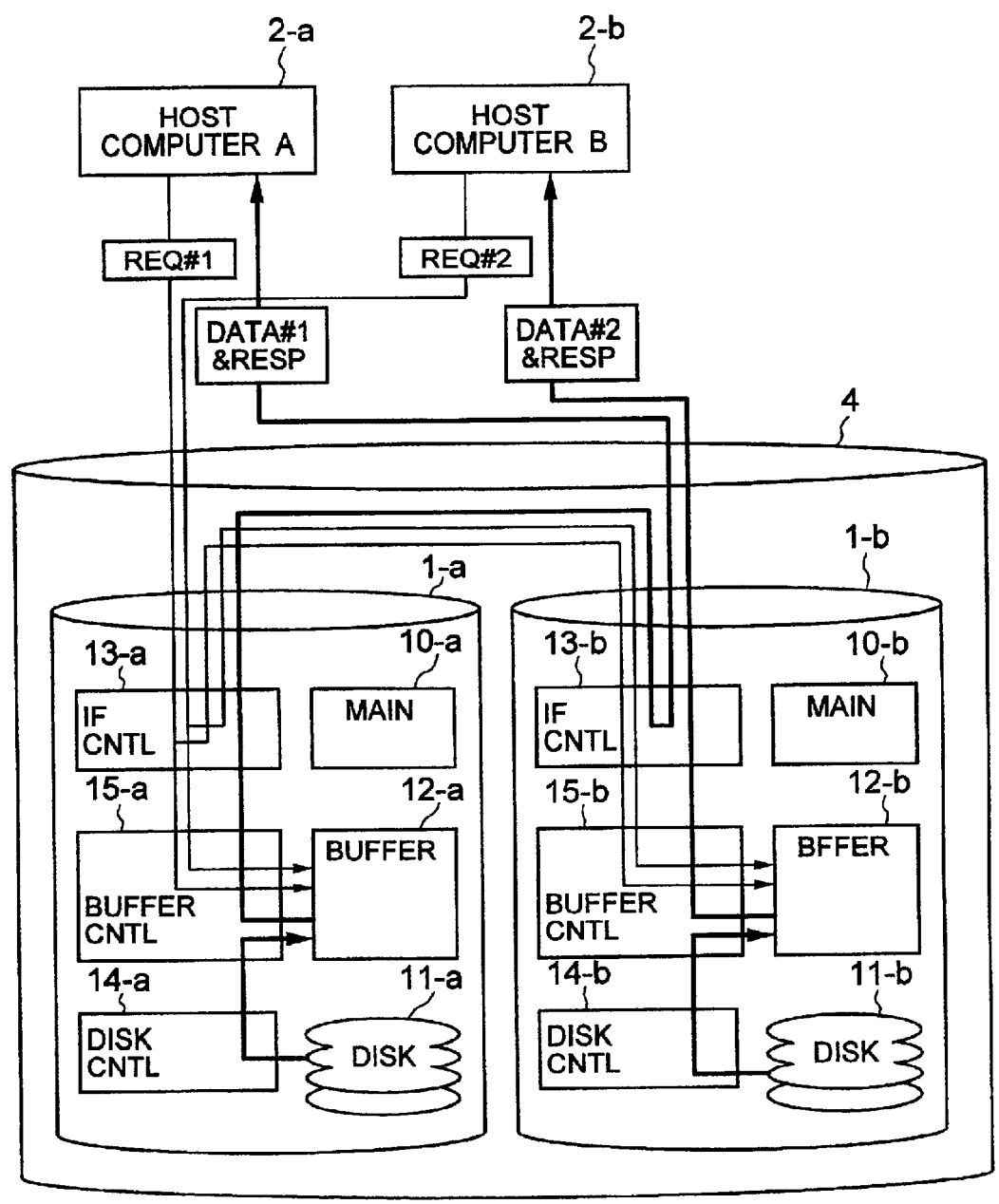
FIG. 4 is a diagram showing an example of information transfer in the read processing in the first embodiment of the present invention.

FIG. 4 is a diagram showing the flow of the transfer processing of a read data request and read data when the host computers 2-a/b issue a read data request to the storage subsystem 4 composed of disk devices 1-a/b, especially when a read data request from the host computer 2-a is processed by the disk device 1-a and a read data request from the host computer 2-b is processed by the disk device 1-b.

As described above, the read data request from the host computers 2-a/b is at least stored in the buffers 12 of the disk devices 1-a/b via the interface controller 13 of the disk device 1-a.

The disk devices 1-a/b check if they should process the received access request. If the disk device has judged that it should process the read data request, it reads data from the disks 11, transmits the read data to the host computers 2-a/b, and generates and transmits status information. Because data read by the disk device 1-a is transmitted to the host computer 2-a, it is transferred to the host computer 2-a via the interface controller 13 of the disk device 1-b as in the conventional system.

Figure 5:
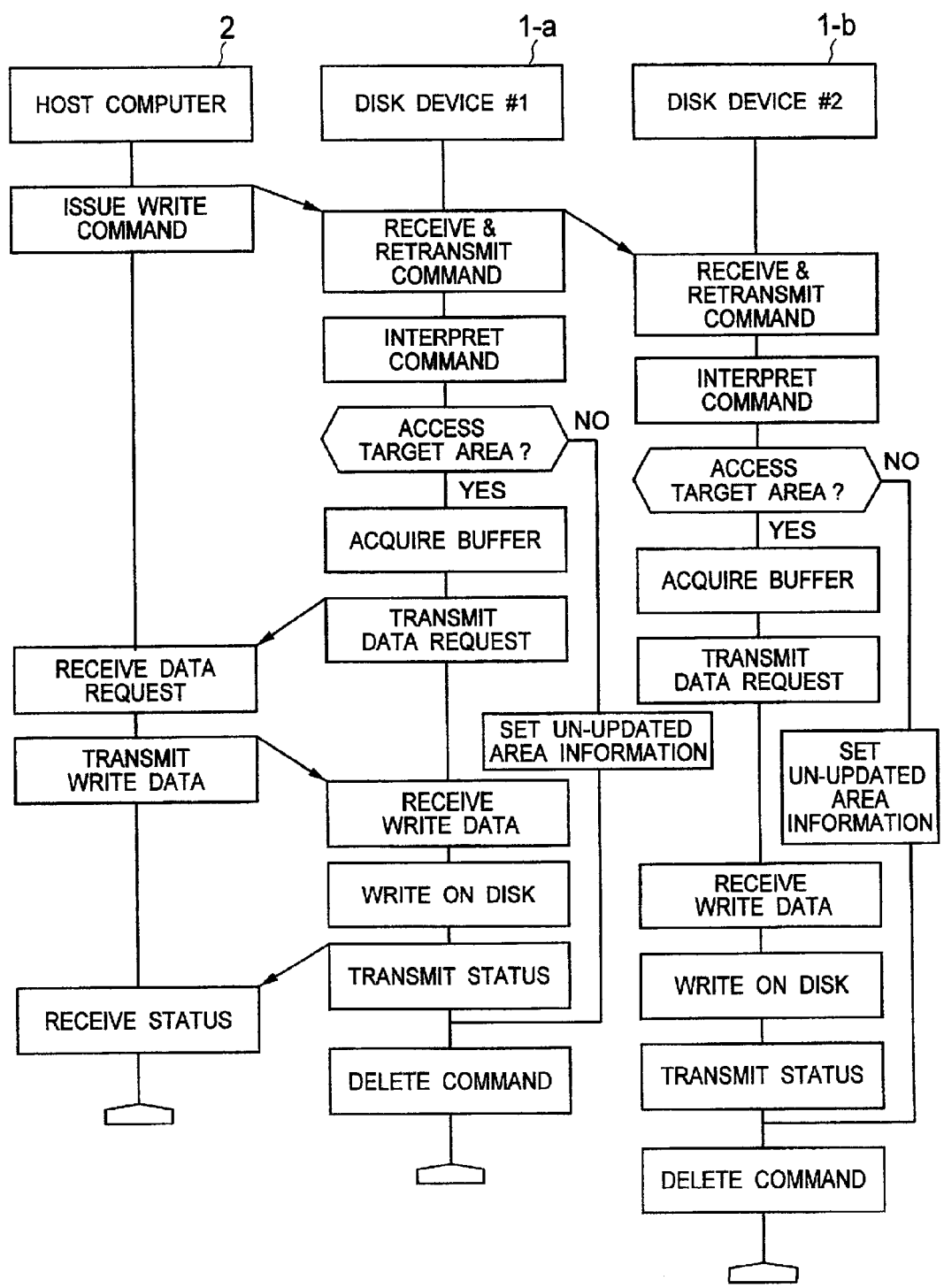
FIG. 5 is a diagram showing an example of the write processing flow in the first embodiment of the present invention.

FIG. 5 is a diagram showing the flow of processing of the disk devices when the host computer 2 issues a write data request to the storage subsystem 4 composed of the disk devices 1-a/b.
(1) Access Request (command) Reception and Retransmission The processing is the same as that shown in FIG. 3 except that the access request is not a read data request but a write data request. A write data request issued from the host computer 2 to the storage subsystem 4 is received first via the receiver 20 of the disk device 1-a as frame information.

The disk device 1-a stores the write data request into the received command storage unit 26 of the buffer 12 via the receive frame processing unit 22.

The retransmit judging unit 24 of the disk device 1-*a* is set up by the cooperation control information 28 to retransmit the access request, transmitted from the host computers 2 to the storage subsystem 4, to the disk device 1-*b* in the following stage. Thus, the retransmit judging unit 24 finds that the received frame information is an access request, generates the retransmission control (indication) signal, and transmits the signal to the output selection unit 25. As a result, in response to the retransmission control (indication) signal, the selection unit 25 retransmits the write data request, which was transmitted from the host computer, to the disk device 1-*b* in the following stage.

The disk device 1-*b* stores the write data request, retransmitted by the disk device 1-*a*, into the received command storage unit 26 of the buffer 12 via the receive frame processing unit 22. The retransmit judging unit 24 of the disk device 1-*b* is set up by the cooperation control information 28 not to retransmit the access request to the device in the following stage.

(2) Access Request (command) Interpretation and Access Request (command) Execution The processing is the same as that shown in FIG. 3 except that the access request is not a read data request but a write data request. Each of the disk devices 1-*a/b* interprets the access request stored in the received command storage unit 26 and finds that the access request is a write data request. In addition, the disk device checks if the device should process the write data request based on the write request area information included in the write data request and the cooperation control information 28.

The disk device, which has judged that it will process the request, acquires the transmission/reception data storage unit 27 of the buffer 12 and transmits a write data transfer start request to the host computer.

In addition, the disk device stores write data, which is transmitted from the host computer 2 which received the write data transfer start request, into the transmission/reception data storage unit 27 acquired in advance. Then, after receiving the write data or after disk write processing is completed in which the received write data is written to the disks 11, the disk device generates and transmits status information on the write data request and deletes the access request to complete a series of write data request processing.

On the other hand, the disk device, which has judged that it will not process the request, updates un-updated area management information that will be described later based on the write request area information included in the access request, deletes the access request, and completes the write data request processing.

Figure 6:
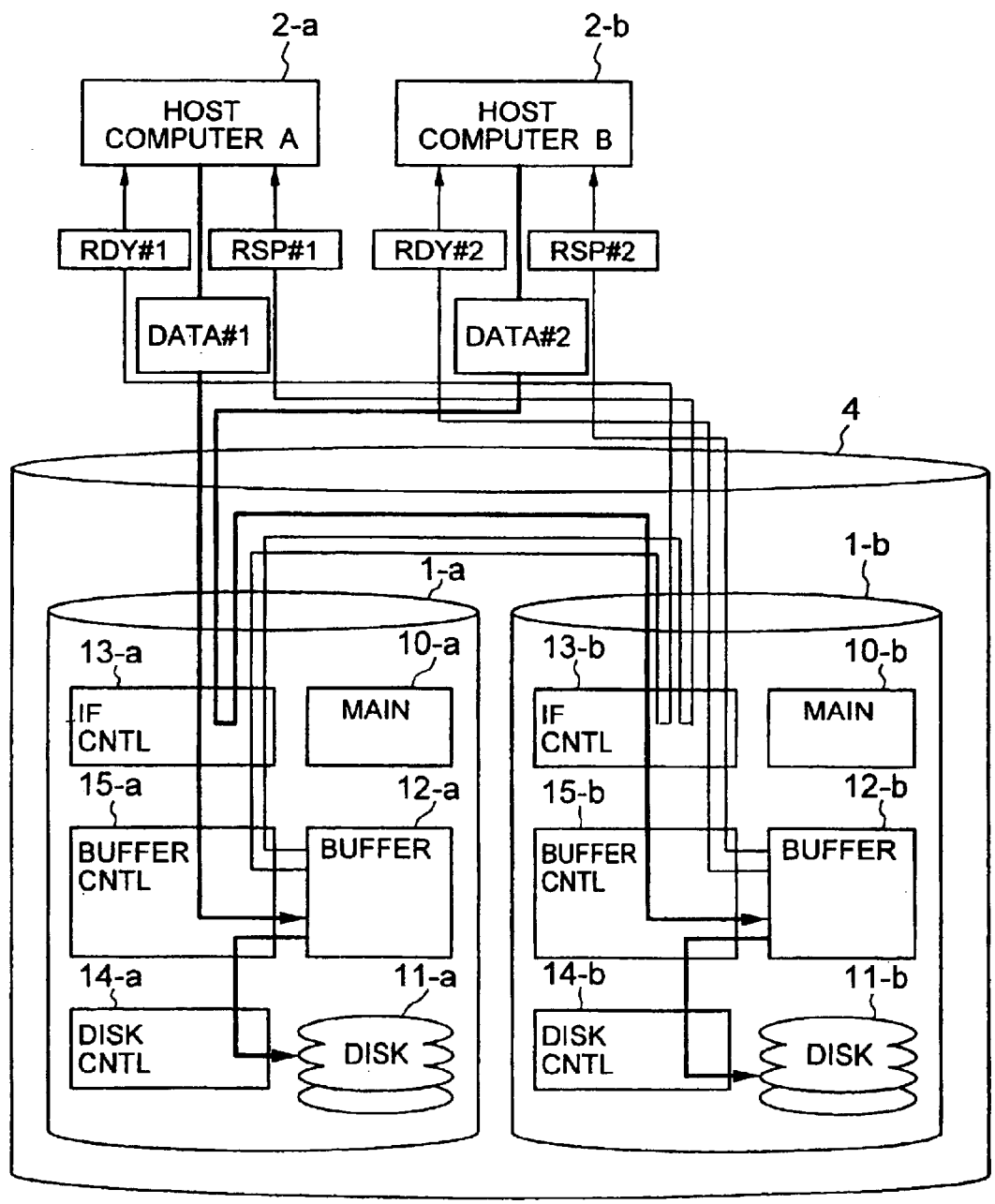
FIG. 6 is a diagram showing an example of information transfer in the write processing in the first embodiment of the present invention.

FIG. 6 is a diagram showing the flow of the transfer processing of a write data transfer start request and write data when the host computers 2-*a/b* issue a write data request to the storage subsystem 4 composed of disk devices 1-*a/b*, especially when a write data request from the host computer 2-*a* is processed by the disk device 1-*a* and a write data request from the host computer 2-*b* is processed by the disk device 1*b*.

As described above, a write data request from the host computers 2-*a/b* is at least stored in the buffers 12 of the disk devices 1-*a/b* via the interface controller 13 of the disk device 1-*a*.

Each of the disk devices 1-*a/b* checks whether it should process the received access request. For the write data request to be processed by the disk device, it transmits a write data transfer start request to the host computer that has transmitted the write data request, and stores write data, which is transmitted from the host computer in response to the transfer start request, into the transmission/reception data storage unit 27 with this as a trigger.

In addition, after receiving write data or after completing disk write processing in which the received write data is written on the disks 11, the disk device generates and transmits status information on the write data request.

In this case, as in the read data transfer processing described above, the write data transfer start request transmitted from the disk device 1-*a* to the host computer 2-*a* and the status information are transferred to the host computer 2-*a* via the interface controller 13 of the disk device 1-*b* as in the conventional system.

The retransmit judging unit 24 of the interface controller 13 of the disk devices 1-*a/b* controls the retransmission (transfer) of the write data, transmitted from the host computers 2-*a/b* to the storage subsystem 4, based on the header information included in the write data frame. That is, based on the header information included in the write data frame, the retransmit judging unit 24 of the interface controller 13 of the disk device 1-*a* checks if the write data from the host computer 2-*a* should be retransmitted (transferred). As a result, the write data is not transferred to the following stage but stored in the buffer 12 of the disk device 1-*a*.

Also, based on the header information included in the write data frame, the retransmit judging unit 24 of the interface controller 13 of the disk device 1-*a* checks if write data from the host computer 2-*b* should be retransmitted (transferred). As a result, data is transferred to the following stage. In addition, based on the header information included in the write data frame, the retransmit judging unit 24 of the interface controller 13 of the disk device 1*b* checks if the write data should be retransmitted (transferred). As a result, the data is not transferred to the following stage but stored in the buffer 12 of the disk device 1*b*.

As described above, in a storage subsystem composed of a plurality of storage devices in this embodiment, each storage device of the storage subsystem comprises means for sharing an access request, transmitted from a host computer to the storage subsystem, among the plurality of storage devices, means for checking if the storage device should process the shared access request and, in addition, means for transferring write data, which is transmitted from the host computer to the storage subsystem, at least to the storage device that judges that it should process it. This makes it possible a low-cost storage subsystem that eliminates the need for a controller controlling the individual storage devices and a high-performance storage subsystem that ensures optimum storage device usage efficiency.

In this embodiment, a write data request from the host computer 2 temporarily causes a mismatch in the data stored in the disk devices 1-*a/b*. The following describes an example of write data update in this embodiment.

Figure 7:
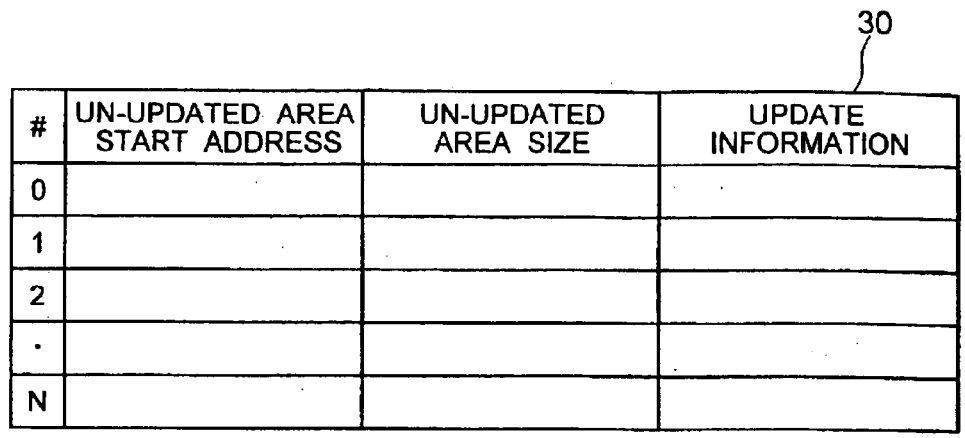
FIG. 7 is a diagram showing an example of the configuration of un-updated area management information in the first embodiment of the present invention.

FIG. 7 is a diagram showing an example of the configuration of un-updated area management information 30 that is updated by a disk device that has judged that it will not process a write data request from the host computer.

The un-updated area management information 30 contains at least information on un-updated areas. In the example shown in the figure, when an access request from a host computer to the storage subsystem is composed of access start address information and access size information, the un-updated area management information 30 comprises un-updated start address information, un-updated size information, and update information such as update time information on the un-updated area.

A disk device, which receives a write data request from a host computer but judges that it will not process the request, updates the un-updated area management information 30 based on the write request area information included in the write data request to manage the mismatching un-updated areas and to allow the un-updated areas to be updated later.

Figure 8:
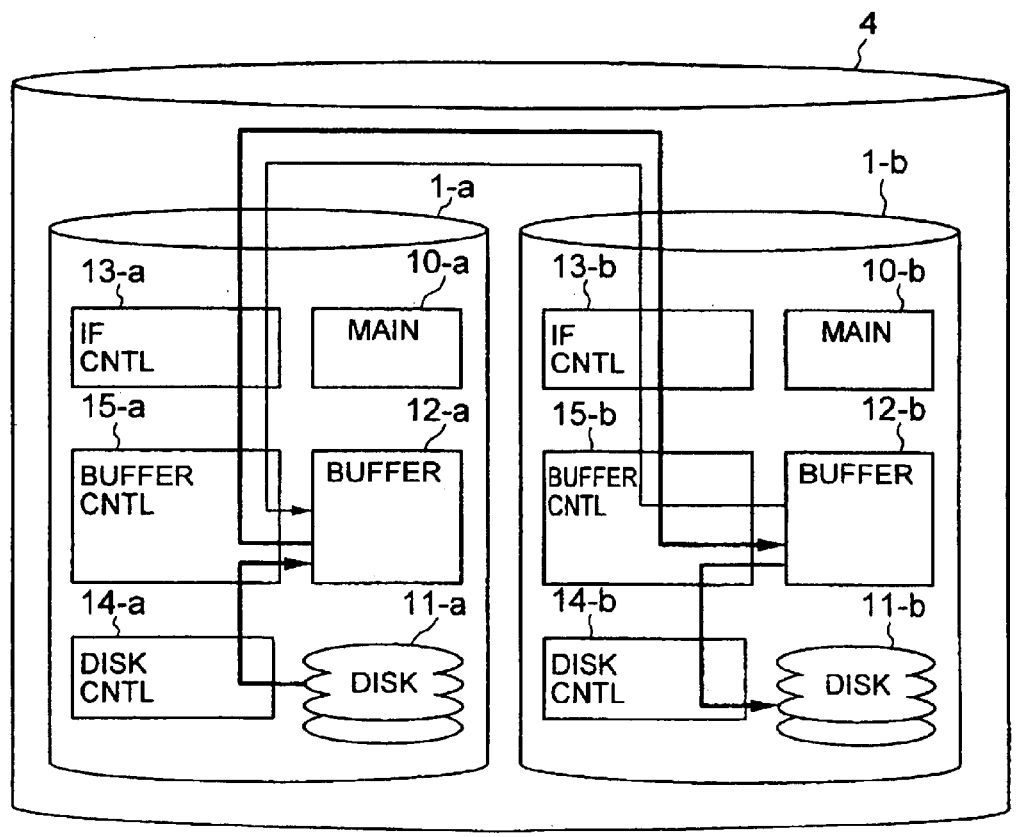
FIG. 8 is a diagram showing an example of information transfer in the update processing of an un-updated area in the first embodiment of the present invention.

FIG. 8 is a diagram showing the flow of the transfer of an update request and update data when the mismatching un-updated areas are updated based on the un-updated area management information 30 of the disk device 1b.

In the figure, the disk device 1-b issues an update request to the partner disk device 1-a based on its own un-updated area management information 30. In response to the update request, the disk device 1-a reads data from the disks 11 as necessary and transmits the requested data to the disk device 1b. The disk device 1-b stores the data received from the disk device 1-a into the disks 11, deletes un-updated area information associated with the processing from the un-updated area management information 30, and completes the un-updated area update processing.

In the above embodiment, a disk device that receives a write data request from a host computer and that judges that it will not process the request manages mismatching un-updated areas and updates the un-updated areas later. However, the present invention is not limited to this method. For example, a disk device that judges that it will process the request may update the un-updated area management information 30 based on the write request area information included in the write data request, manages the mismatching un-updated areas and updates un-updated areas later.

In addition, update processing for un-updated areas may be triggered by any event. For example, update processing may be started when the number of entries registered with the un-updated area management information 30 has reached a predetermined number or when the total size of un-updated areas has reached a predetermined value.

Now, a second embodiment according to the present invention will be described with reference to FIGS. 9, 10, 11, 12, and 13. In this embodiment, a disk device that receives an access request first checks if it should process the request. If it is found as the result of checking that the disk device should not process the request, the disk device transfers the access request to the other disk device. That is, in this embodiment, one of the storage devices of the storage subsystem receives an access request transmitted from a host computer to the storage subsystem, the storage device determines a storage device that should process the access request and, as required, transfers the access request, which was transmitted from the host computer to the storage subsystem, to the storage device that should process the access request. This makes it possible a low-cost storage subsystem that eliminates the need for a controller controlling the individual storage devices and a high-performance storage subsystem that ensures optimum storage device usage efficiency.

Figure 9:
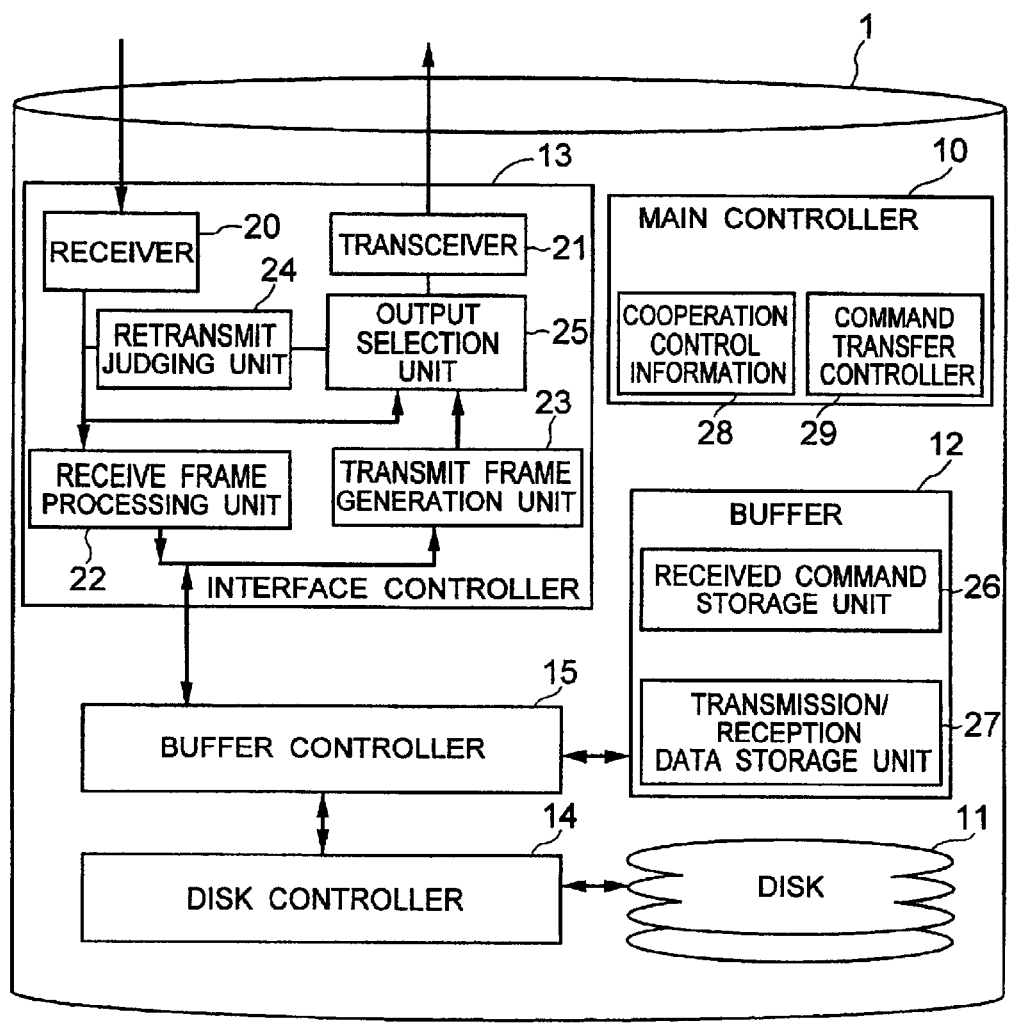
FIG. 9 is a diagram showing an example of the configuration of a storage device in a second embodiment of the present invention.

FIG. 9 is a diagram showing an example of the configuration of a storage device 1 of the storage subsystem 4. The figure shows the same configuration as that shown in FIG. 2 except that a command transfer controller 29 is added that checks if an access request from the host computer 2 is to be transmitted to the partner disk device.

In addition, the cooperation control information 28 has information used to check whether or not an access request from the host computer 2 is to be transferred to the partner disk device. In addition, the retransmit judging unit 24 at least performs retransmission (transfer) control for data, such as frames, transmitted from the host computer 2 to the storage subsystem 4, based on the header information included in the write data frame.

The following describes the operation of read/write data transfer processing in which each disk device checks if the device should process an access request, transmitted from a host computer to the storage subsystem, based on an area requested by the request.

Figure 10:
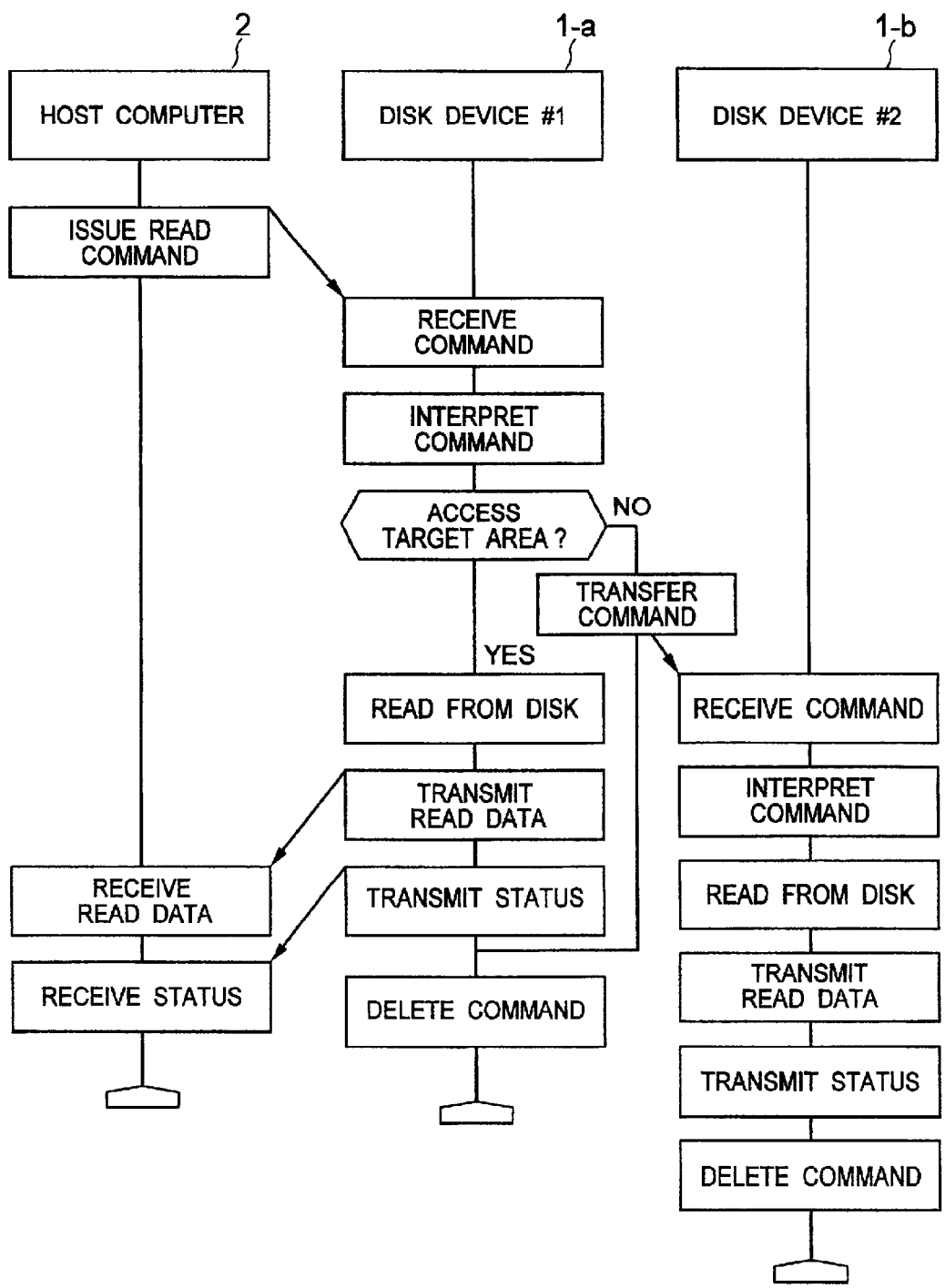
FIG. 10 is a diagram showing an example of the read processing flow in the second embodiment of the present invention.

FIG. 10 is a diagram showing the flow of the processing of the devices when the host computer 2 issues a read data request to the storage subsystem 4 composed of the disk devices 1-a/b. In the description below, it is assumed that the disk device 1-a receives the access request from the host computer 2, checks which device should process the access request and, in addition, controls the transfer of the access request to the disk device 1-b if necessary.

(1) Access Request (command) Reception

The read data request issued from the host computer 2 to the storage subsystem 4 is first stored in the received command storage unit 26 of the buffer 12 as frame information via the receiver 20 and the receive frame processing unit 22 of the disk device 1a.

(2) Access Request (command) Interpretation and Access Request (command) Transfer Processing The disk device 1-a interprets the access request stored in the received command storage unit 26 and finds that the access request is a read data request. In addition, based on the read request area information included in the read data request and the cooperation control information 28, the disk device checks if it should process the read request.

If the disk device judges as a result of checking that it should process the request, the access request is processed by the disk device 1-a. If the disk device judges that it should not process the request, the disk device 1-a transfers the read data request, transmitted from the host computer 2, to the disk device 1-b.

The disk device 1-b stores the read data request, transferred from the disk device 1-a, into the received command storage unit 26 of the buffer 12 via the receiver 20 and the receive frame processing unit 22. In addition, the disk device 1-b interprets the access request stored in the received command storage unit 26 and finds that the access request is a read data request.

(3) Access Request (command) Execution

The disk device 1-a, which has judged that it will process the access request, or the disk device 1-b, which has received the access request from the disk device 1-a, starts reading data from the disks 11 into the transmission/reception data storage unit 27 of the buffer 12 via the disk controller 14 based on the read data request. In addition, the disk device transmits the read data to the host computer 2 via the interface controller 13. Then, after transmitting the read data, the disk device generates and transmits status information on the read data request and deletes the access request to complete a series of read data request processing. If the disk device 1-a has judged that it will not process the access request, it deletes the read data request and completes the read data request processing.

Figure 11:
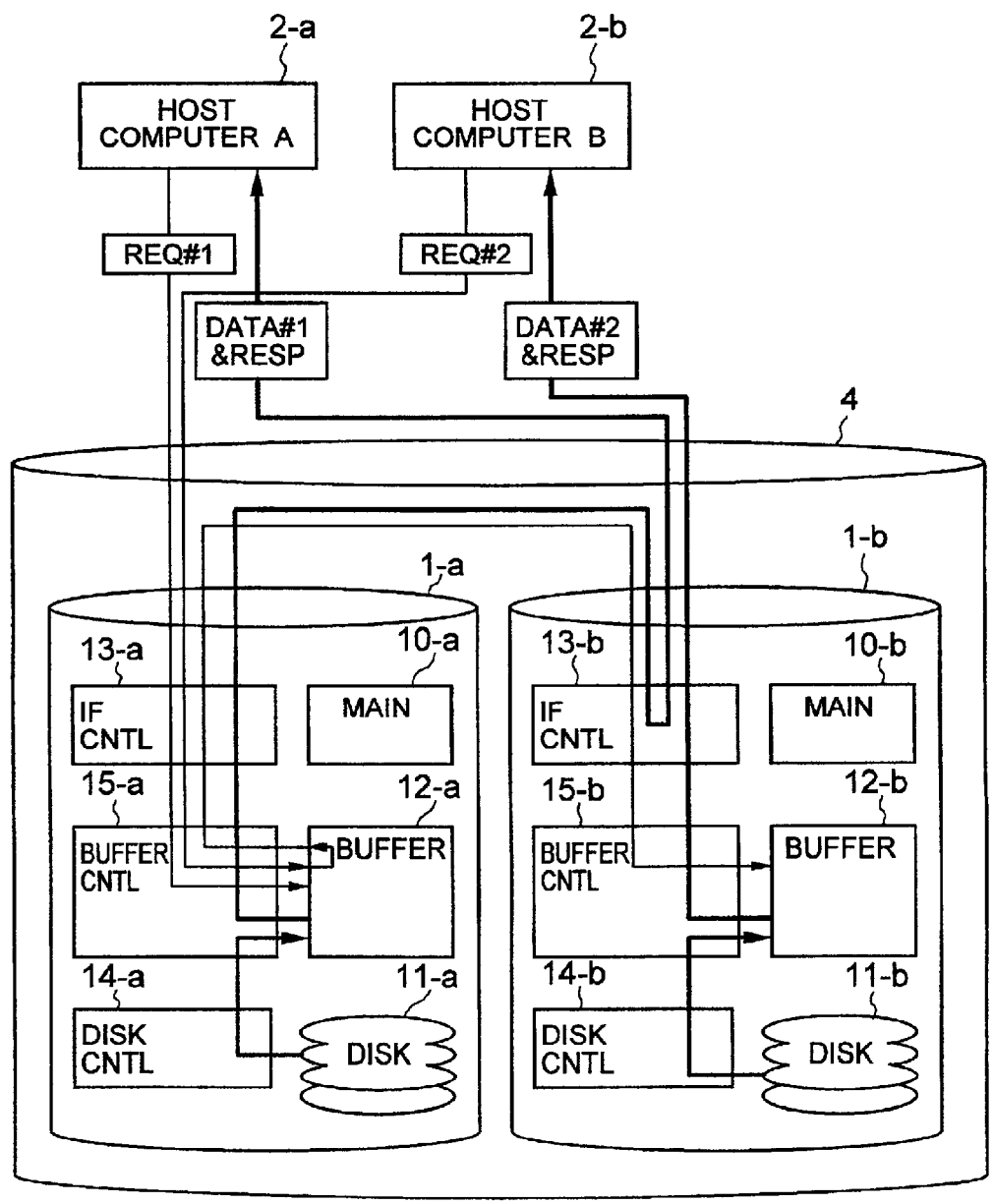
FIG. 11 is a diagram showing an example of information transfer in the read processing in the second embodiment of the present invention.

FIG. 11 is a diagram showing the flow of the transfer processing of a read data request and read data when the host computers 2-a/b issue a read data request to the storage subsystem 4 composed of disk devices 1-a/b, especially when a read data request from the host computer 2-a is processed by the disk device 1-a and a read data request from the host computer 2-b is processed by the disk device 1-b.

As described above, a read data request from the host computer 2-a is received by the disk device 1a but is not transferred to the disk device 1-b. Also, a read data request from the host computer 2-b is received by the disk device 1-*b* through transfer control processing performed by the disk device 1-*a* described above.

In response to a read data request, the disk devices 1-*a*/*b* read data from the disks 11, transmit the read data to the host computers 2-*a*/*b*, generate status information, and transmit it to the host computers.

Because the read data that is transmitted by the disk device 1-*a* is transmitted to the host computer 2-*a*, it is transferred to the host computer 2-*a* via the interface controller 13 of the disk device 1-*b* as in the conventional system.

Figure 12:
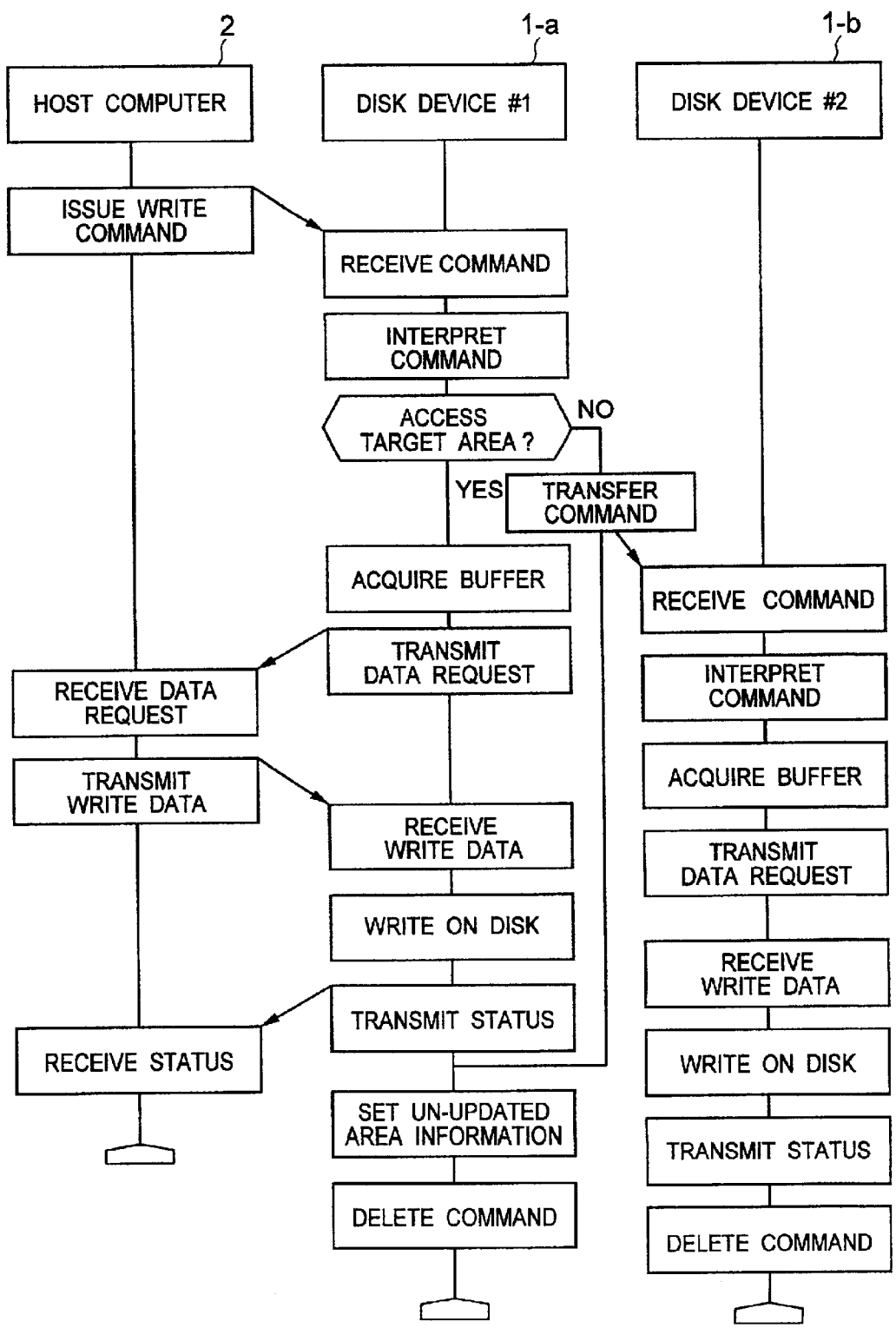
FIG. 12 is a diagram showing an example of the write processing flow in the second embodiment of the present invention.

FIG. 12 is a diagram showing the flow of processing of the devices when a write data request is issued from the host computer 2 to the storage subsystem 4 composed of the disk devices 1-*a*/*b*.

(1) Access Request (command) Reception

A write data request issued from the host computer 2 to the storage subsystem 4 is first stored in the received command storage unit 26 of the buffer 12 as frame information via the receiver 20 and the receive frame processing unit 22 of the disk device 1*a*.

(2) Access Request (command) Interpretation and Access Request (command) Transfer Processing The disk device 1-*a* interprets the access request stored in the received command storage unit 26 and finds that the access request is a write data request. In addition, the disk device checks if it should process the write data request based on the write data request area information included in the write data request and on the cooperation control information 28.

If the disk device 1-*a* judges that it will process the access request, it processes the access request. If the disk device 1-*a* judges that it will not process the access request, it transfers the write data request, received from the host computer 2, to the disk device 1-*b*.

The disk device 1-*b* stores the write data request, which is transferred from the disk device 1-*a*, in the received command storage unit 26 of the buffer 12 via the receiver 20 and the receive frame processing unit 22. In addition, the disk device 1-*b* interprets the access request stored in the received command storage unit 26 and finds that the access request is a write data request.

(3) Access Request (command) Execution

The disk device 1-*a*, which has judged that it will process the access request, or the disk device 1-*b*, which has received the access request from the disk device 1-*a*, acquires the transmission/reception data storage unit 27 of the buffer 12 based on the write data request and transmits a write data transfer start request to the host computer. In addition, the disk device stores write data, received from the host computer that has received the write data transfer start request, in the transmission/reception data storage unit 27 acquired in advance.

Then, after receiving the write data or after completing the disk write processing in which the received write data is written on the disks 11, the disk device generates and transmits status information on the write data request.

(4) Access Request (command) Completion

After generation and transmission of the status information, the disk device 1-*b* deletes the access request and completes a series of write data request processing. Also, after generation and transmission of the status information or, when the disk device has judged that the disk device will not process the write data request, after transferring the write data request, which was received from the host computer 2, to the disk device 1-*b*, the disk device 1-*a* updates un-updated area management information, which will be described later, based on the write request area information included in the write data request. After that, the disk device deletes the access request and completes a series of write data request processing.

The flow of a write data transfer start request and the write data transfer processing in this embodiment when a write data request is issued from the host computers 2-*a*/*b* to the storage subsystem 4 composed of the disk devices 1-*a*/*b*, especially when a write data request from the host computer 2-*a* is processed by the disk device 1-*a* and a write data request from the host computer 2-*b* is processed by the disk device 1-*b*, is the same as that shown in FIG. 6 and, therefore, the description is omitted.

As described above, note that an access request from the host computers 2-*a*/*b* is at least stored in the buffer 12 of the disk device 1-*a* and, when the disk device 1-*a* judges that it will not process the access request, is transferred to the disk device 1-*b*.

As described above, in a storage subsystem composed of a plurality of storage devices in this embodiment, at least one of the storage devices of the storage subsystem receives an access request transmitted from a host computer to the storage subsystem. In addition, the storage device comprises means for judging a storage device that is to process the access request and for transferring as necessary the access request, transmitted from the host computer to the storage subsystem, to the storage device that is to process the access request. This configuration makes it possible a low-cost storage subsystem that eliminates the need for a controller controlling the individual storage devices and a high-performance storage subsystem that ensures optimum storage device usage efficiency.

As in the embodiment described above, a write data request from the host computer 2 in this embodiment also temporarily causes a mismatch in the data stored in the disk devices 1-*a*/*b*. The following describes an example of write data update processing in this embodiment.

In this embodiment, the disk device 1-*a* has un-updated area management information composed of the un-updated area management information 30 described above and information indicating whether newly stored data is latest (hereinafter called update type information). Based on the write request area information included in the write data request from the host computer, the disk device 1-*a* updates and manages the un-updated area information included in the un-updated area management information described above and the update type information to manage mismatching un-updated areas and to update the un-updated areas later.

Figure 13:
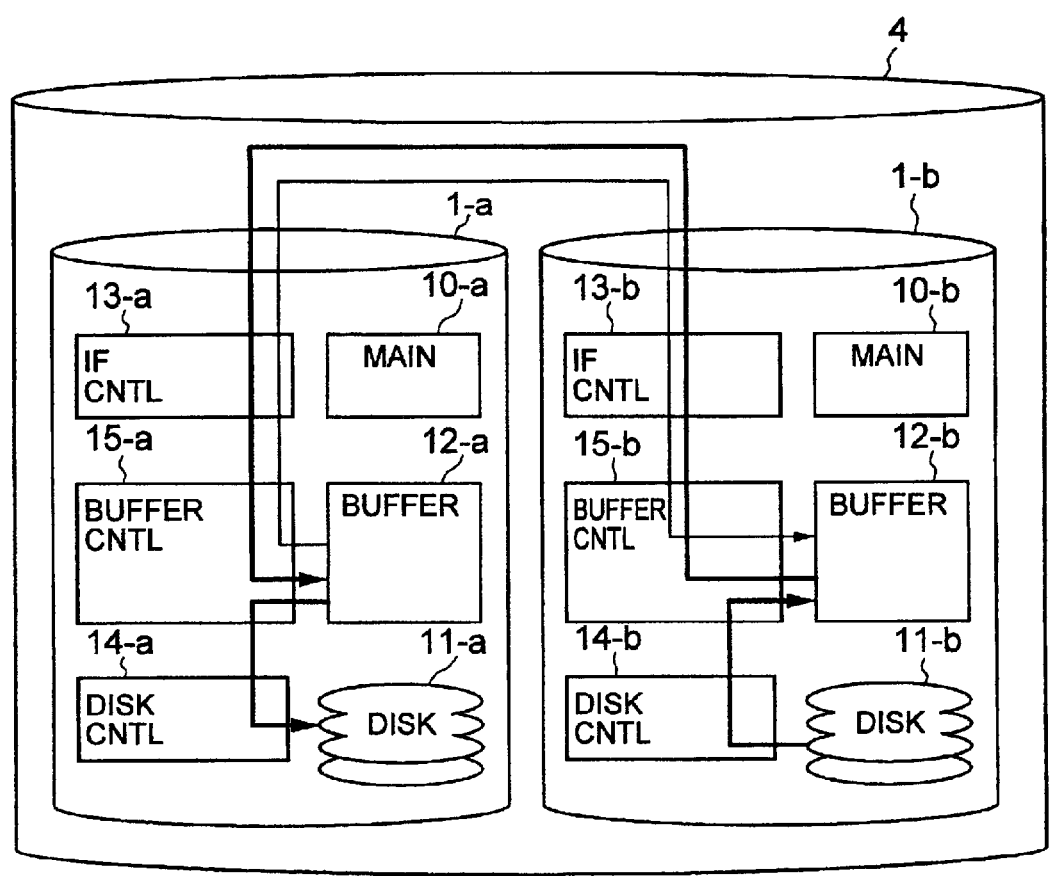
FIG. 13 is a diagram showing an example of information transfer in the update processing of an un-updated area in the second embodiment of the present invention.

FIG. 13 is a diagram showing the flow of the transfer of an update request and update data when mismatching un-updated areas are updated based on the un-updated area management information in the disk device 1-*a*. In the example shown in the figure, the disk device 1-*a* uses the latest data stored in the disk device 1-*b* to update its own data.

The disk device 1-*a* issues an update request (latest data transmission request) to the partner disk device 1-*b* based on the un-updated area management information composed at least of un-updated area information and update type information. In response to the update request, the disk device 1-*b* reads data from the disks 11 as necessary and transmits the requested data to the disk device 1-*a*. The disk device 1-*a* stores the data, which was received from the disk device 1-*b*, on the disks 11, deletes the un-updated area information associated with this processing from the un-updated area management information 30, and completes the un-updated area update processing.

Alternatively, when the disk device 1-*a* uses the latest data stored in itself to update the disk device 1-*b*, the disk device 1-*a* issues an update request (latest data reception request) to the partner disk device 1-*b* based on the un-updated area management information, and then transmits update data. In response to the update request and the update data, the disk device 1-*b* stores the data, received from the disk device 1-*a*, on the disks 11. In addition, after transmitting the update data, the disk device 1-*a* deletes the un-updated area information associated with this processing from the un-updated area management information 30 and completes the un-updated area update processing.

In the above embodiment, the operation has been described in which a disk device checks if it should process an access request based on the access request area included in an access request transmitted from a host computer to the storage subsystem. However, the present invention is not limited to this method.

For example, when a storage device manages stored data on an object (file) basis, the device may check if it should process an access request based on the object (file) information included in the access request transmitted from a host computer to the storage subsystem. By using object (file) information also for un-updated area information stored at least as the un-updated area management information, the update processing of un-updated areas described above may be performed.

In a RAID1 storage subsystem composed of a plurality of storage devices in the above embodiment, the storage devices or at least one storage device of the storage subsystem has means for checking if it should process an access request transmitted from a host computer to the storage subsystem, eliminating the need for a controller controlling the individual storage devices. This configuration also makes it possible a high-performance storage subsystem that ensures optimum storage device usage efficiency.

However, though temporarily, mismatching data is generated on the duplicated disk devices by a write data request from a host computer because of an attempt to ensure the optimum storage device efficiency and, in some cases, this requires write data updating described above. In addition, the write data update processing described above requires write data to be transferred via the interface 3 and therefore increases the load of the interface 3.

The following describes an embodiment that allows a plurality of storage devices 1 of the storage subsystem 4 to share an access request, especially, a write data request, transmitted from the host computer 2 to the storage subsystem 4 and that causes a plurality of paired storage devices to synchronize to process the write data. This method reduces the load of the interface to increase performance.

A third embodiment of the present invention will be described with reference to FIGS. 14 and 15.

In this embodiment, a plurality of storage devices 1 of the storage subsystem 4 share a write data request transmitted from the host computer 2 to the storage subsystem 4 and, at the same time, the plurality of storage devices of the storage subsystem 4 synchronize one another to transfer write data. This configuration makes it possible a low-cost storage subsystem that eliminates the need for a controller controlling the individual storage devices and a high-performance storage subsystem that reduces the load of the interface.

The configuration of a storage device (disk device) of the storage subsystem in this embodiment is the same as that shown in FIG. 2 except that, when the retransmit judging unit 24 controls the retransmission data such as frames transmitted from the host computer 2 to the storage subsystem 4, it also controls the retransmission of write data based on the cooperation control information 28. Therefore, the description of the configuration is omitted here.

Also omitted is the description of a read data request transmitted from a host computer to the storage subsystem. A read data request, which is not included in the scope of this embodiment, may be processed in any of the methods of the embodiments described above.

The following describes the operation of an example in which a pair of two storage devices synchronize one another to process a write data request, transmitted from a host commuter to the storage subsystem, to transfer write data.

Figure 14:
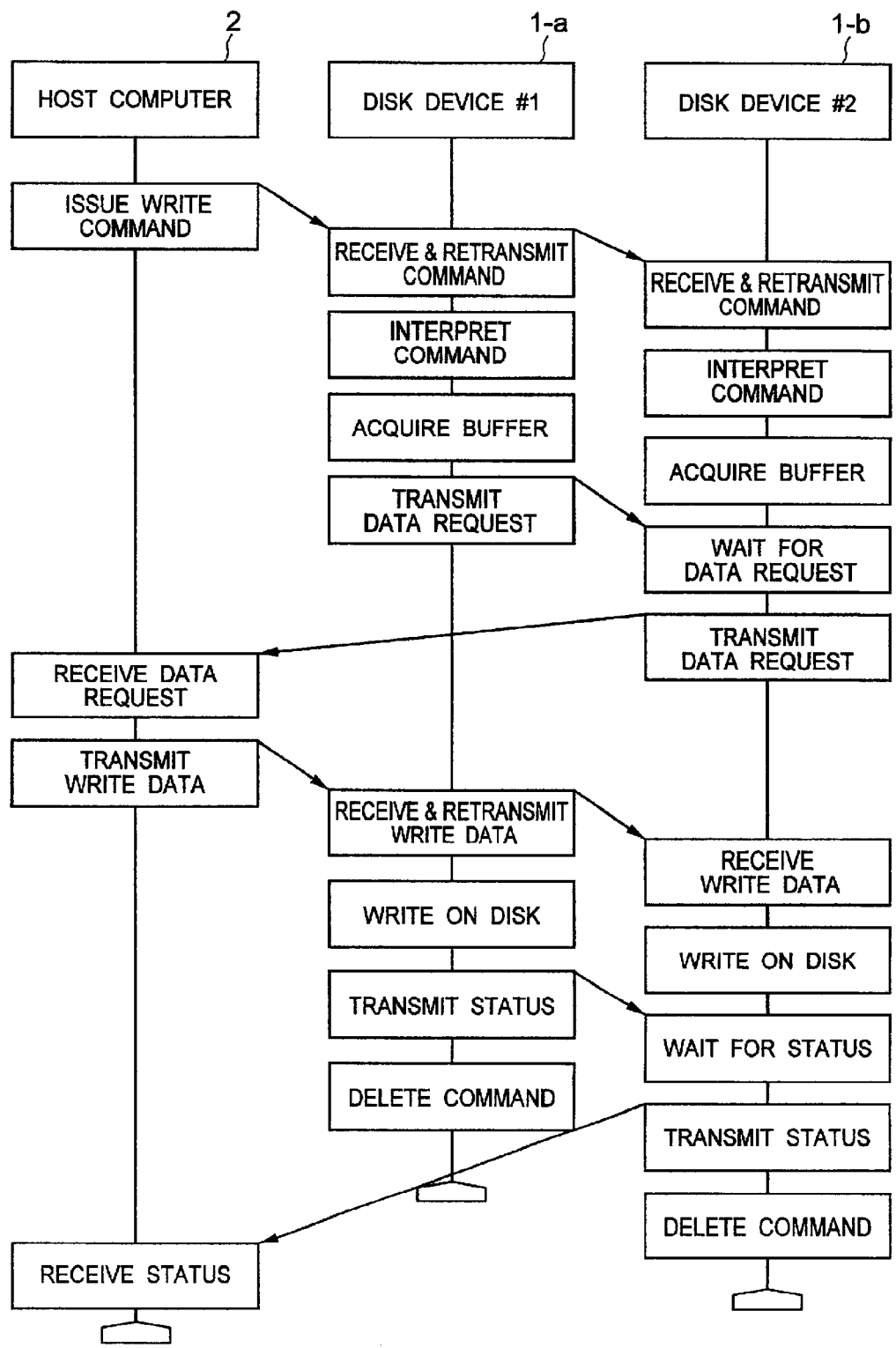
FIG. 14 is a diagram showing an example of the write processing flow in a third embodiment of the present invention.

FIG. 14 is a diagram showing the flow of the processing of the devices when a write data request is issued from the host computer 2 to the storage subsystem 4 composed of the disk devices 1-*a*/*b*.

Figure 15:
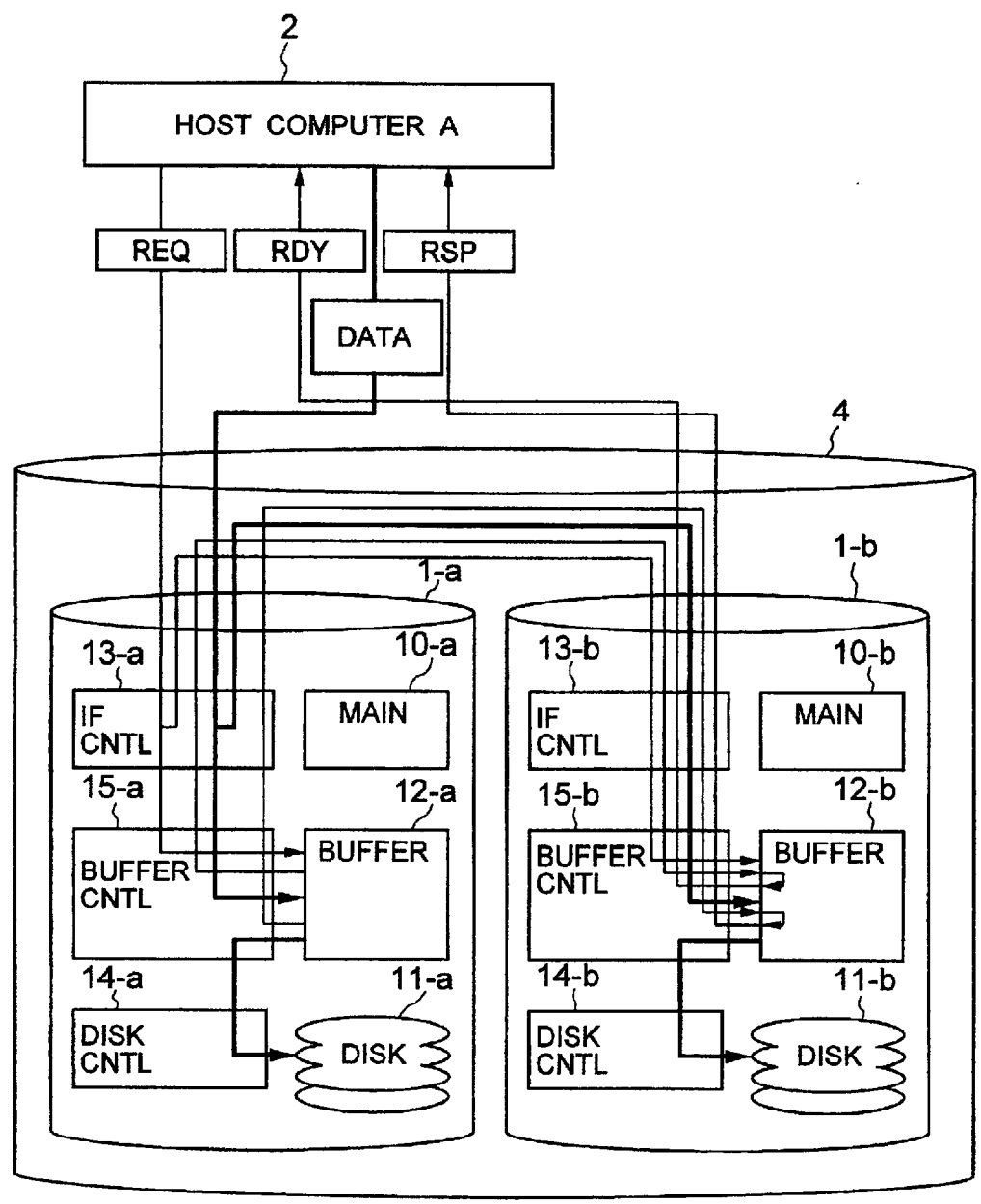
FIG. 15 is a diagram showing an example of information transfer in the write processing in the third embodiment of the present invention.

FIG. 15 is a diagram showing the flow of a write data request, a write data transfer start request, and write data transfer processing when a write data request is issued from the host computer 2 to the storage subsystem 4 composed of the disk devices 1-*a*/*b*.

(1) Access Request (command) Reception and Retransmission Processing

A write data request issued from the host computer 2 to the storage subsystem 4 is received first as frame information via the receiver 20 of the disk device 1-*a*.

The disk device 1-*a* stores the write data request into the received command storage unit 26 of the buffer 12 via the receive frame processing unit 22.

The retransmit judging unit 24 of the disk device 1-*a* is set up by the cooperation control information 28 to retransmit the access request, transmitted from the host computers 2 to the storage subsystem 4, to the disk device 1-*b* in the following stage. Thus, the retransmit judging unit 24 finds that the received frame information is an access request, generates the retransmission control (indication) signal, and transmits the signal to the output selection unit 25. In response to the retransmission control (indication) signal, the selection unit 25 retransmits the write data request, which was transmitted from the host computer, to the disk device 1-*b* in the following stage.

The disk device 1-*b* stores the write data request, retransmitted by the disk device 1-*a*, into the received command storage unit 26 of the buffer 12 via the receive frame processing unit 22. The retransmit judging unit 24 of the disk device 1-*b* is set up by the cooperation control information 28 not to retransmit the access request to the device in the following stage.

(2) Access Request (command) Interpretation and Access Request (command) Execution The disk devices 1-*a*/*b* interpret the access request stored in the received command storage unit 26, find that the access request is a write data request, and acquire the transmission/reception data storage unit 27 of the buffer 12. The disk device 1-*a* transmits a write data transfer start request to the disk device 1-*b* when its own transmission/reception data storage unit 27 is acquired. On the other hand, the disk device 1-*b* transmits a write data transfer start request to the host computer 2 when its own transmission/reception data storage unit 27 is acquired and when the write data transfer start request is received from the disk device 1-*a*.

The host computer 2 starts transmitting write data when it receives the write data transfer start request.

The write data transmitted from the host computer 2 is received first via the receiver 20 of the disk device 1-*a*. The disk device 1-*a* stores the write data in the transmission/reception data storage unit 27 of the buffer 12 via the receive frame processing unit 22.

The retransmit judging unit 24 of the disk device 1-*a* is set up by the cooperation control information 28 to retransmit the write data, transmitted from the host computers 2 to the storage subsystem 4, to the disk device 1-*b* in the following stage. Thus, the retransmit judging unit 24 finds that the received frame information is write data, generates the retransmission control (indication) signal, and transmits the signal to the output selection unit 25. In response to the retransmission control (indication) signal, the output selection unit 25 retransmits the write data, which was transmitted from the host computer, to the disk device 1-*b* in the following stage.

The disk device 1-*b* stores the write data, retransmitted by the disk device 1-*a*, into the transmission/reception data storage unit 27 of the buffer 12 via the receive frame processing unit 22. The retransmit judging unit 24 of the disk device 1-*b* is set up by the cooperation control information 28 not to retransmit the write data to the device in the following stage.

After receiving the write data or after completing the disk write processing in which the received write data is written on the disks 11, the disk device 1-*a* generates status information on the write data request and transmits it to the disk device 1-*b*. In addition, the disk device 1-*a* deletes the write data request and completes a series of write data request processing.

The disk device 1-*b* receives the status information from the disk device 1-*a* after receiving the write data or after completing the disk write processing in which the received data is written on the disks 11, generates status information on the write data request, transmits the status information to the host computer 2, deletes the write data request, and completes a series of write data request processing.

As described above, the RAID1 storage subsystem composed of a plurality of storage devices in this embodiment comprises means for allowing the storage devices of the storage subsystem to share at least a write data request transmitted from a host computer to the storage subsystem and the means for synchronizing the transfer of write data, requested by the shared write data request between the storage devices, and the transmission of status information on the write data request between a pair of storage devices. This makes it possible a low-cost storage subsystem that eliminates the need for a controller controlling the individual storage devices and a high-performance storage subsystem that eliminates the need for data update processing between the storage devices and reduces the load of the interface.

Although a RAID1 storage subsystem composed only of a plurality of storage devices, to which the present invention is applied, has been described in the embodiment, the present invention is not limited to that configuration. For example, even a conventional disk array device, that is, a disk array device composed of a plurality of disk devices and a controller controlling those disk devices, may use disk devices to which the present invention is applied. This makes the controller configuration simple and reduces its cost.

In addition, the following describes an example of checking whether or not a disk device should process an access request transmitted from the host computer.

FIG. 16 is a diagram showing an example of information forming the cooperation control information 28.

In the figure, the cooperation control information 28 comprises a storage subsystem ID unique to the storage subsystem 4, a storage device ID unique to each storage device, a cooperation storage ID unique to another storage device that cooperates with the storage device, and cooperation processing mode information. The information also comprises a cooperation area size, an active area start address, and an active area size as management information on the areas involved in cooperation processing.

An example of information that is set up for the disk devices 1-*a/b* is shown. In the example, ID__0 is set for both disk devices 1-*a/b* as the storage subsystem ID of the storage subsystem 4. ID__1 is set for the disk device 1-*a*, and ID__2 is set for disk device 1-*b*, as the storage device ID unique to each storage device. ID__2 is set for the disk device 1-*a*, and ID__1 is set for disk device 1-*b*, as the storage device ID unique to another storage device with which each storage device cooperates. "Command retransmission" is set for the disk device 1-*a*, and "command reception" is set for the disk device 1-*b*, as the cooperation processing mode. In addition, with the cooperation area size as N, 0 is set for the disk device 1-*a*, and N/2 is set for the disk device 1-*b*, as the active area start address. N/2 is set for both disk devices 1-*a/b* as the active area size.

The storage subsystem ID of the storage subsystem 4, the storage device ID unique to each storage device, the storage device ID unique to another storage device with which each device cooperates, and cooperation processing mode information constitute cooperation control information that is used in frame data retransmission judgment that will be described later.

FIG. 17 is a diagram showing an example of the configuration of access request information stipulated by the FCP (Fibre Channel Protocol) as access request information from a host computer. In the figure, the access request information includes the start address (Logical Block Address in the figure) of an access request target area and the access request target area size (Transfer Length).

Upon receiving access request information from the host computer, the storage device 1 checks if it should process the access request, that is, if the access request is to access an active area in its own storage device, based on the active area start address and the active area size included in its own cooperation control information and based on the access request target area start address and the access request target area size included in the access request information from the host computer. The storage device accesses the area only when the access request is issued for an active area in the storage device.

For example, if the access request target area requested by the host computer is N/2 or lower, storage device #1 processes the access request from the host computer; if the target area is N/2 or higher, storage device #2 processes the access request. In addition, if the access request target area requested by the host computer is associated with the active areas of storage device #1 and storage device #2, storage device #1 and storage device #2 each process the access request for their own active area.

In the above embodiment, address information and size information are stored as the cooperation processing target area management information and, based on the address information and the size information included in the access request information from the host computer, a storage device checks if it should process the access request. However, the present invention is not limited to this method. For example, the logical unit number in FIG. 17 (FCP__LUN or Logical Unit Number in the figure) may be used as the condition. In this case, the cooperation control information 28 of the storage device 1 includes active logical unit number information as management information on the cooperation processing target area.

In addition, when the access request information transmitted from the host computer includes an object name, such as a file name, the storage device 1 may include active object list information in the cooperation control information 28 as the management information on the cooperation processing area. This makes it possible for the storage device to check if it should process the access request from the host computer on an object basis.

If an access request target area requested by the host computer is associated with the active areas of the disk device 1-*a* and the disk device 1-*b* in the second embodiment described above, the disk device 1-*a* may modify the access request information, transmitted from the host computer, into an access request for the active area of the disk device 1-*b* and transmit the modified access request to the disk device 1-*b* for performing cooperation control processing between the disk devices 1-*a*/*b*.

Alternatively, the disk device 1-*b* may have the cooperation control information (active area start address information, active area size information, and so on), check if it should process the access request, that is, if the access request is issued to its own active area, based on the access request target area information included in the access request information from the host computer, and then process the access request issued to its own active area. This method allows cooperation control processing to be implemented between the disk devices 1-*a*/*b* without the disk device 1-*a* having to modify the access request information, transmitted from the host computer, into an access request for the active area of the disk device 1-*b* and to transmit it to the disk device 1-*b*.

Furthermore, the following describes an example of how to judge whether or not data, such as frame data transferred between the host computer and the storage device, is to be retransmitted to the device in the following stage.

FIG. 18 is a diagram showing an example of the configuration of frame header information stipulated by the FC-PH (Fibre Channel PHYSICAL AND SIGNALING INTERFACE) that is information transferred between a host computer and the storage subsystem.

In the figure, the frame header information is composed of the following fields: frame data destination/source information field (D_ID: Destination_Identifier, S_ID: Source_Identifer), frame data type information (R_CTL: Routing Control, TYPE: Data structure type) field, and frame data related exchange identification information (RX_ID: Responder Exchange_Identifier, OX_ID: Originator Exchange$_{13}$ Identifier) field.

First, when frame data (read data, write data transfer start request, status information, and so on) is transmitted from the storage subsystem 4 (disk devices 1-*a*/*b*) to the host computer, the identifier of the host computer is set in the frame data destination information (D_ID) field of the frame header information. When a disk device receives this frame data, it retransmits the frame data.

The following describes an example of retransmission judging processing when frame data is sent from the host computer to the storage subsystem 4, that is, when frame data (access request, write data) in which the identifier of the storage subsystem 4 is set in the frame data destination information (D_ID) field of the frame header information is sent.

(1) Access Request

Upon receiving frame data (access request) transmitted from the host computer to the storage subsystem 4, the retransmit judging unit 24 checks the frame data type information (R_CTL, TYPE) of the frame header information and finds that the frame data is an access request. In addition, the retransmit judging unit 24 checks the cooperation processing mode ("command retransmission" and/or "command reception") that is set in the cooperation control information 28 and judges whether or not the received access request is to be retransmitted to the device in the following stage. Frame data (access request) retransmission processing is performed in this manner.

(2) Write Data

Upon receiving frame data (write data) transmitted from the host computer to the storage subsystem 4, the retransmit judging unit 24 checks the frame data type information (R_CTL, TYPE) of the frame header information and finds that the frame data is write data. In addition, the retransmit judging unit 24 checks if the frame data source information (S_ID) and the exchange identification information (RX_ID, OX_ID) of the frame header information match those registered with write processing management information that will be described later. If they match, the write data is received; if they do not, the write data is retransmitted to the device in the following stage. Frame data (write data) retransmission processing is performed in this manner.

FIG. 19 is a diagram showing an example of the configuration the write processing management information. In this example, a combination of the exchange identification information (RX_ID, OX_ID) of write processing in execution (processing not yet completed) and the access request source host computer identification information (Host ID) is stored as the write processing management information. For example, in the figure, a storage device checks if the exchange identification information (RX_ID and/or OX_ID) included in the frame header of a write data frame, transmitted from the same host computer (Host ID (S_ID)= ID_3) to the storage subsystem 4, matches those registered with the write processing management information to check to see if the storage device should receive the write data frame.

Although the minimum configuration of the write processing management information may comprise the exchange identification information (OX_ID) of write processing in execution (processing not yet completed) and the access request source host computer identification information (Host ID), the OX_ID is set by the host computer and its independence is not guaranteed. On the other hand, because the RX_ID may be set by the storage device, it is preferably be stored as the write processing management information and, in addition, it should be different between the storage devices that cooperate.

Next, a fourth embodiment of the present invention will be described.

In the fourth embodiment, each storage device of the storage subsystem checks if it should process an access request based on control information (cooperation control information), provided for allowing a plurality of storage devices to cooperate each other to process an access request from a host computer, and access request information from the host computer to the storage subsystem.

In a fifth embodiment, a storage device in the fourth embodiment has additional information on the operation status of the other storage device to process access request from the host computer to the storage subsystem even when an error occurs in a storage device of the storage subsystem.

In a sixth embodiment, the storage device in the above embodiment has additional multiple interface controllers to transfer access request information from the host computer and user data transferred between the storage devices of the storage subsystem via separate interfaces (transmission paths).

[Fourth Embodiment] (Normal Operation)

Now, the fourth embodiment of the present invention will be described with reference to FIGS. 20–33.

Figure 20:
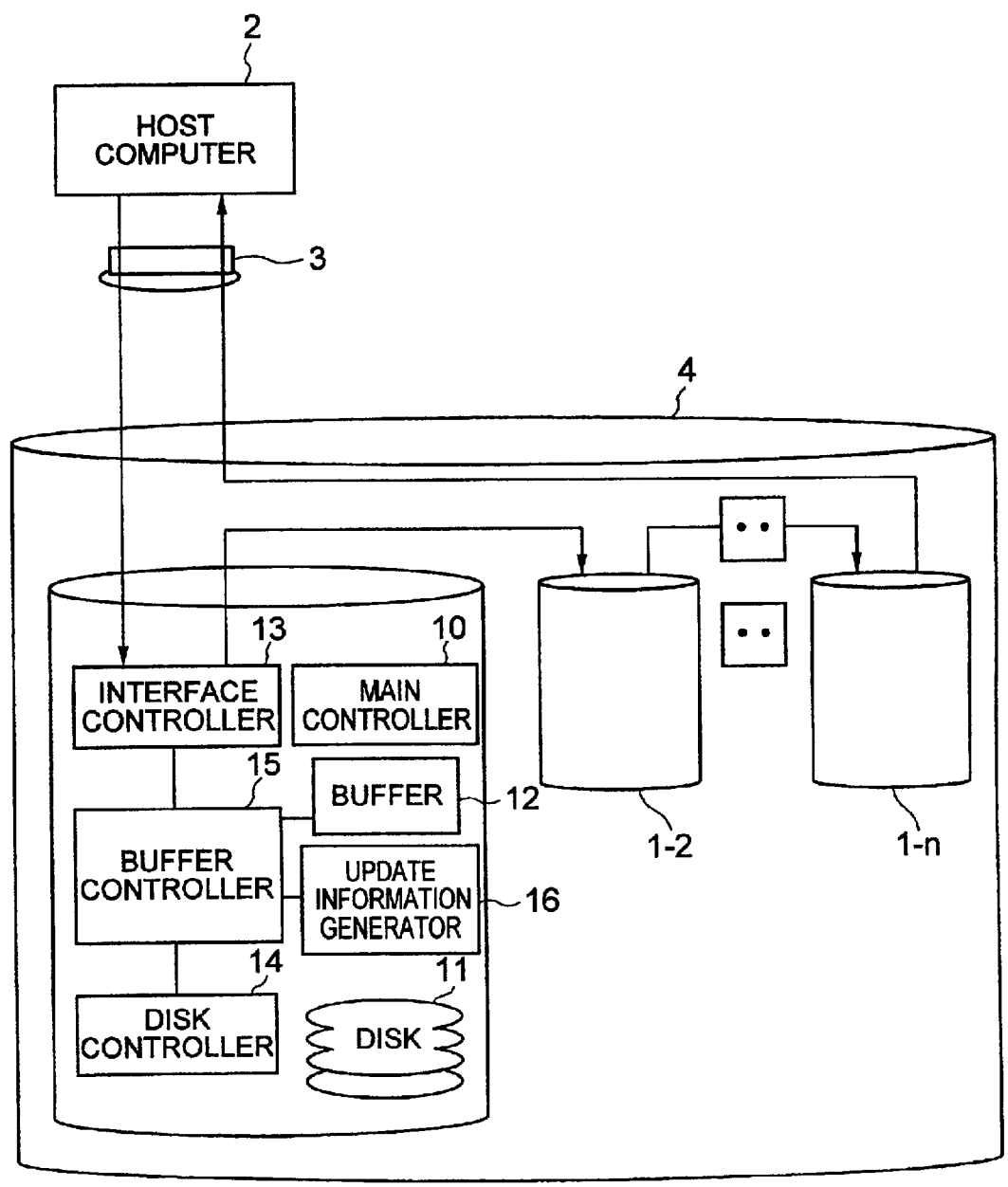
FIG. 20 is a diagram showing an example of the configuration of a data processing system according to the present invention.

FIG. 20 is a diagram showing an example of a data processing system comprising a storage subsystem 4, composed of multiple (N, N> 1) storage devices 1, and a host computer 2. In the figure, each storage device 1 of the storage subsystem 4 is connected directly to the host computer 2 via a loop-type (hereinafter loop) interface 3.

In the figure, a disk device is used as an example of the storage device 1. Each disk device 1 comprises disks 11 that are storage media for storing data to be accessed by the host computer 2, a buffer 12 that temporarily stores data to be transferred between the disks 11 and the host computer 2, an interface controller 13 that controls the protocol of interface with the host computer 2, a disk controller 14 that records data to or reproduces data from the disks 11, a buffer controller 15 that controls access to the buffer 12, an update information generator 16 that executes the exclusive logical sum operation between write data (new data) received via a write data request from the host computer and data-to-be-updated (old data) already stored on the disks to generate update information, and a main controller 10 that controls all components.

Figure 21:
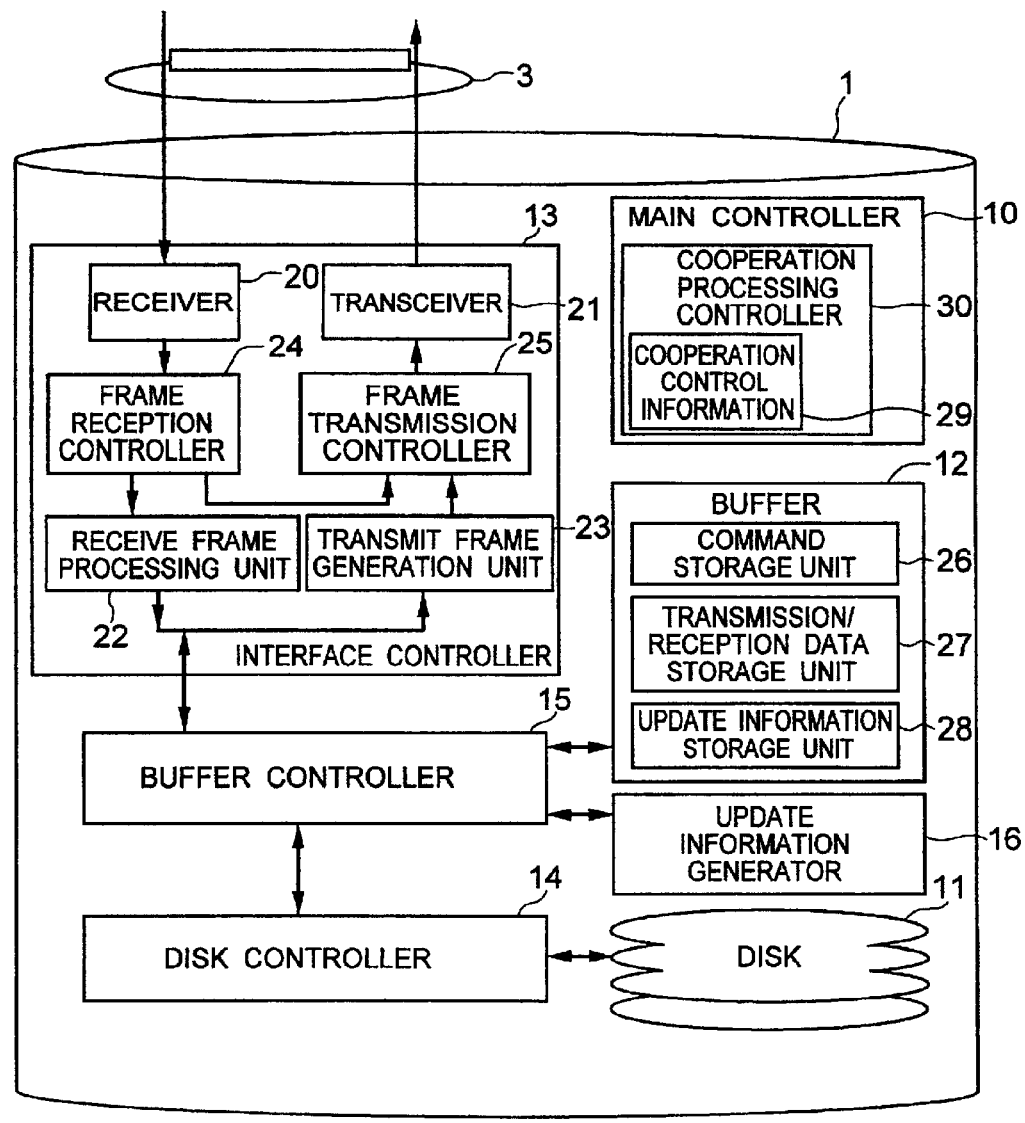
FIG. 21 is a diagram showing an example of the configuration of a storage device in a fourth embodiment of the present invention.

FIG. 21 is a diagram showing an example of the configuration of the disk device 1 of the storage subsystem 4.

In the figure, the interface controller 13 comprises a receiver 20 that receives data via the interface 3, a transceiver 21 that transmits data in the same way, a receive frame processing unit 22 that checks a received frame for an error or, when storing at least a part of the frame information in the buffer 12, controls where to store it, and a transmit frame generation unit 23 that generates additional information such as header information of frame information when transmitting data such as a frame.

The interface controller 13 further comprises a frame reception controller 24 that controls (retransmission control) whether the device is to retransmit data, such as a frame received by the receiver 20, to the device in the following stage or to receive the data and a frame transmission controller 25 that selects one of data retransmitted by the frame reception controller 24 and data from the transmit frame generation unit 23 and outputs the selected data to the transceiver 21.

The buffer 12 comprises a received command storage unit 26 in which an access request (command) received from the host computer 2 is stored, a transmission/reception data storage unit 27 in which data transmitted to or received from the host computer 2 is stored, and an update information storage unit 28 in which update information generated by the update information generator 16 is stored.

The main controller 10 comprises a cooperation processing controller 30 that controls processing, which will be performed by the device in response to the access request, based on cooperation control information 29 that will be described later and access request information transmitted from the host computer 2 to the storage subsystem 4.

The retransmission control of the frame reception controller 24 is performed based on the control information from the cooperation processing controller 30 and the header information of a frame.

FIG. 22 is a diagram showing an example of the configuration of the cooperation control information 29 and an example of setting in each storage device. In the figure, the cooperation control information 29 comprises storage device identification information (shared ID) on the storage subsystem 4, device identification information (unique ID) unique to each storage device, position map information indicating a relative position in the loop interface 3, and command transfer mode information that specifies a mode indicating whether or not an access request frame received from the previous stage is to be retransmitted to the device in the following stage.

In addition, the management information of the RAID configuration comprises RAID level information, a redundant data management size, and information on the number of data disks/number of redundant data disks that is the configuration information on the number of disks of the storage subsystem 4. This information is set up for each storage device.

FIG. 23 is a diagram showing the configuration of frame information in the Fibre Channel Arbitrated Loop (FC-AL), an example of the loop interface 3.

In the figure, the frame information comprises an SOF (Start of Frame) indicating the start of the frame information, header information including a frame information type and a destination/source, a payload (user data) to be transferred between devices, a CRC (Cyclic Redundancy Check) that is the redundant data for the payload, and an EOF (End of Frame) indicating the end of the frame information.

FIG. 24 is a diagram showing an example of the header information. It comprises R_CTL/TYPE indicating a frame information type, D_ID/S_ID indicating the destination/source of the frame information, and so on.

FIG. 25 is a diagram showing an example of access request information transferred as a payload. It comprises a logical unit number (FCP_LUN) specifying an access request target, address information (Logical Block Address), transfer length information (Transfer Length), an operation code (Operation Code) indicating access request type information, and so on.

The following describes how storage devices 1-1 to 1-N cooperate each other to process an access request transmitted from the host computer 2 to the storage subsystem 4.

(1) Access Request (command) Reception and Retransmission

Figure 26:
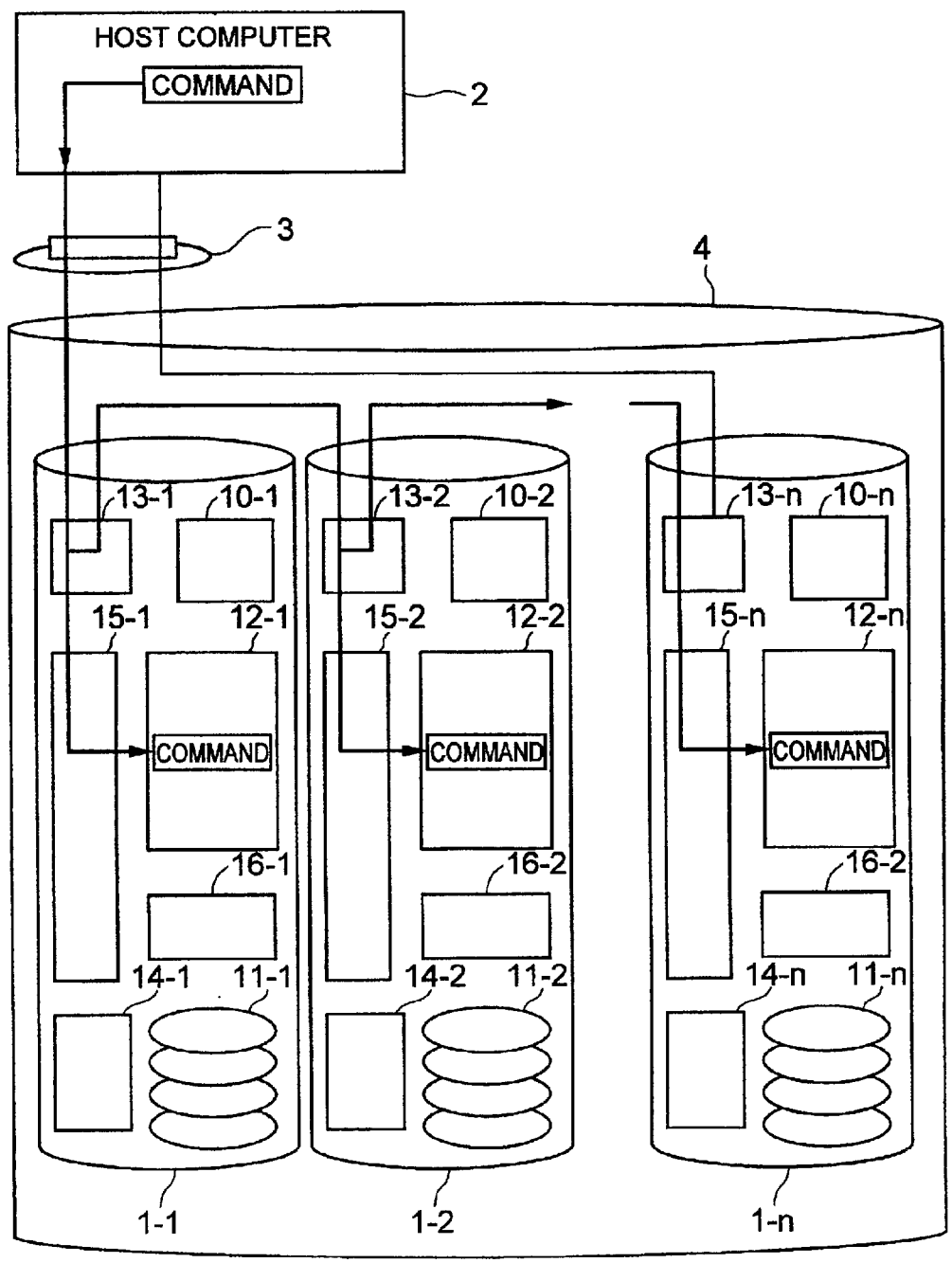
FIG. 26 is a diagram showing an example of the transfer processing flow of access request information in the present invention.

FIG. 26 is a diagram showing an example of the processing of each storage device when an access request is issued from the host computer 2 to the storage subsystem 4 composed of the storage devices 1-1 to 1-N.

First, an access request (command) issued from the host computer 2 to the storage subsystem 4 is received via the receiver 20 of the storage device 1-1 as frame information.

The storage device 1-1 stores the access request in the received command storage unit 26 of the buffer 12 via the frame reception controller 24 and the receive frame processing unit 22.

The frame reception controller 24 of the storage device 1-1 is set up by the command transfer mode of the cooperation control information 29 to retransmit the access request, transmitted from the host computer 2 to the storage subsystem 4, to the device in the following stage ("Reception & retransmission"). Thus, the frame reception controller 24 checks the header information of the received frame information, finds that the frame information is an access request, and retransmits the access request, transmitted from the host computer, to the device in the following stage via the frame transmission controller 25 ("Reception & retransmission").

The storage devices 1-2 to (N-1) in the following stages also perform command reception and retransmission processing as described above.

In the storage device 1-N in the last stage, the command transfer mode of the cooperation control information 29 is set up not to retransmit the access request, transmitted from the host computer 2 to the storage subsystem 4, to the device in the following stage ("Reception only"). Thus, the storage device checks the header information of the received frame, finds that the frame information is an access request, and does not retransmit the access request to the device in the following stage but only stores it in the received command storage unit 26 of the buffer 12.

The access request (command) reception and retransmission processing described above allows the storage devices 1-1 to 1-N, which cooperate each other, to share an access request from the host computer 2 without starting access request transfer processing.

(2-1) Read Processing (by One Storage Device)

Figure 27:
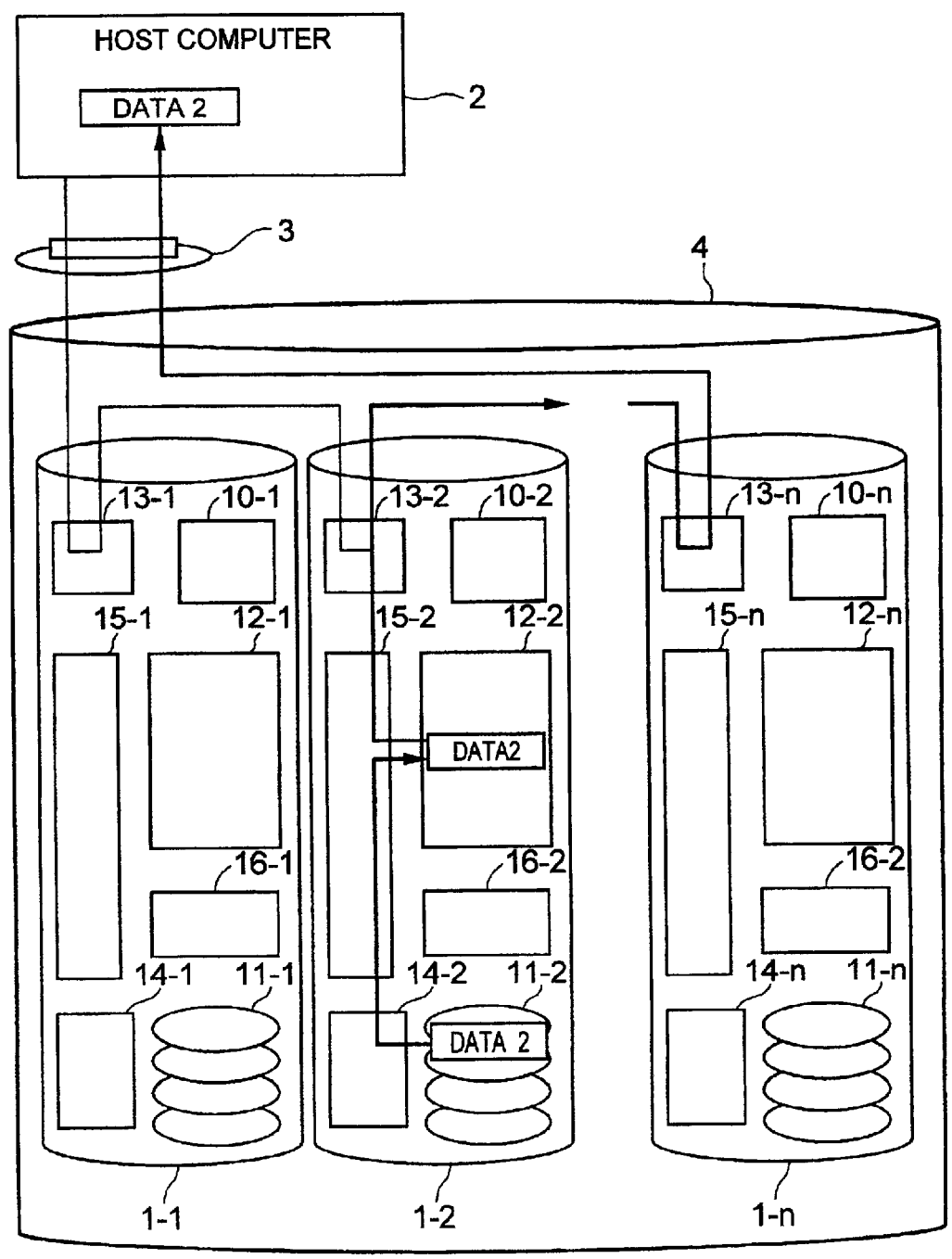
FIG. 27 is a diagram showing an example of the read data transfer processing (single) in the fourth embodiment of the present invention.

FIG. 27 is a diagram showing an example of data transfer processing in which the access request from the host computer 2 is a read data request and one storage device may process the access request. In the figure, it is assumed that the storage device 1-2 performs data transmission processing (transmit Data 2).

Each of the storages devices 1-1 to 1-N checks if it should process the access request based on the access request information stored in the received command storage unit 26 and the cooperation control information 29.

The storage device 1-2, which has judged that it will process the access request, starts reading data from the disks 11-2 into the transmission/reception data storage unit 27-2 of the buffer 12-2 via the disk controller 14-2 and, in addition, transmits the read data to the host computer 2 via the interface controller 13-2. In addition, after transmitting the read data, the storage device generates and transmits status information on the access request and deletes the access request to complete a series of the read data request processing.

On the other hand, a disk device, which has judged that it will not process the access request, deletes the access request and completes the processing of the read data request.

The storage devices 1-3 to 1-N, which are in the stages following storage device 1-2, only retransmit the frame information (read data, status), transmitted from the storage device 1-2, based on the header information.

(2-2) Read Processing (by Multiple Storage Devices)

Figure 28:
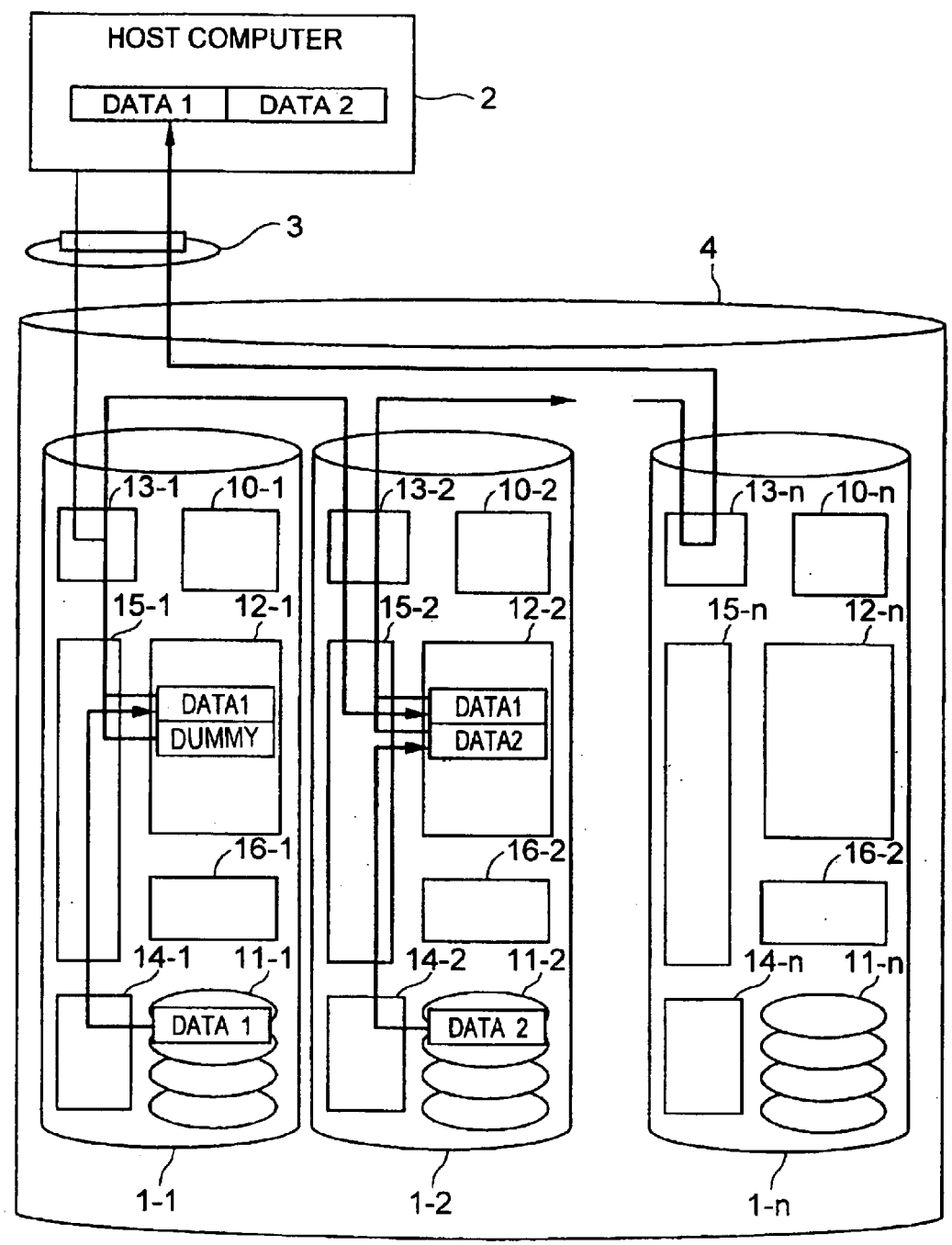
FIG. 28 is a diagram showing an example of the read data transfer processing (multiple) in the fourth embodiment of the present invention.

FIG. 28 is a diagram showing an example of data transfer processing of each storage device where the access request from the host computer 2 is a read data request and multiple storage devices are required to process the access request. In the figure, it is assumed that the storage devices 1-1/2 perform data transmission processing (transmit Data 1/Data 2).

FIG. 29 is a diagram showing an example of the configuration of a data frame (payload) when multiple storage devices are required to transfer data. Conventionally, a data frame (payload) is composed only of user data. By contrast, a data frame in this embodiment is composed of user data segments 0-n, generated by dividing the user data into units each corresponding to a storage device that processes the data, and flags (data valid bit) each indicating whether data in the corresponding user data segment is valid.

In the description below, the storage device that processes the access request and that is in the first stage (which receives data first from the host computer) may start transmitting read data/status information based on the access request information and the cooperation control information 29. However, the present invention is not limited to this method. Any algorithm may be used to determine a storage device that starts transmitting read data.

As in the above description, each of storage devices 1-1 to 1-N checks if it should process the access request based on the access request information stored in the received command storage unit 26 and the cooperation control information 29. A disk device, which has judged that it will not process the access request, deletes the access request and completes the read data request processing.

The storage devices 1-1/2, which have judged that they will process the access request, starts reading data from the disks 11-1/2 via the disk controllers 14-1/2 into the transmission/reception data storage units 27-1/2 of the buffers 12-1/2 via the disk controllers 14-1/2.

The storage device 1-1, which is allowed to start transmitting read data, transmits it to the host computer 2 as follows. For example, the storage device performs data frame information transmission processing by storing its own read data in user data segment 0 and dummy data in the other user data segments (1) and by setting the flag corresponding to user data segment 0 to "Valid" and the flags corresponding to the other user segments to "Invalid". In addition, the storage device generates and transmits status information on the processing and deletes the access request to complete a series of read data processing.

The storage device 1-2, which is prohibited to start transmitting read data, transmits it to the host computer 2 as follows. For example, the storage device stores its own read data into user data segment 1 of the read data frame received from the storage device 1-1 and sets the flag corresponding to user data segment 1 to "Valid". In addition, the storage device generates new status information from the status information on the processing and from the status information received from the device in the previous stage, transmits it to the host computer, and deletes the access request to complete a series of read data processing.

In the storage device in the last stage that performs the data transmission processing described above, that is, in the storage device that generates the final-format data frame information to be transmitted to the host computer, it is desirable that the flag (Data Valid bit) area indicating whether or not the data in the user data segment is valid be deleted and that a payload composed only of user data be sent to the host computer.

Status information is transmitted to the host computer 2 as follows. That is, the storage device in the last stage that transmits data, that is, the storage device that generates the final-format data frame information to be transmitted to the host computer, generates new status information from the status information received from the device in the previous stage and from its own status information, and transmits the generated status information to the host computer 2.

(2-3) Write Processing (Data Update Processing by One Storage Device)

Figure 30:
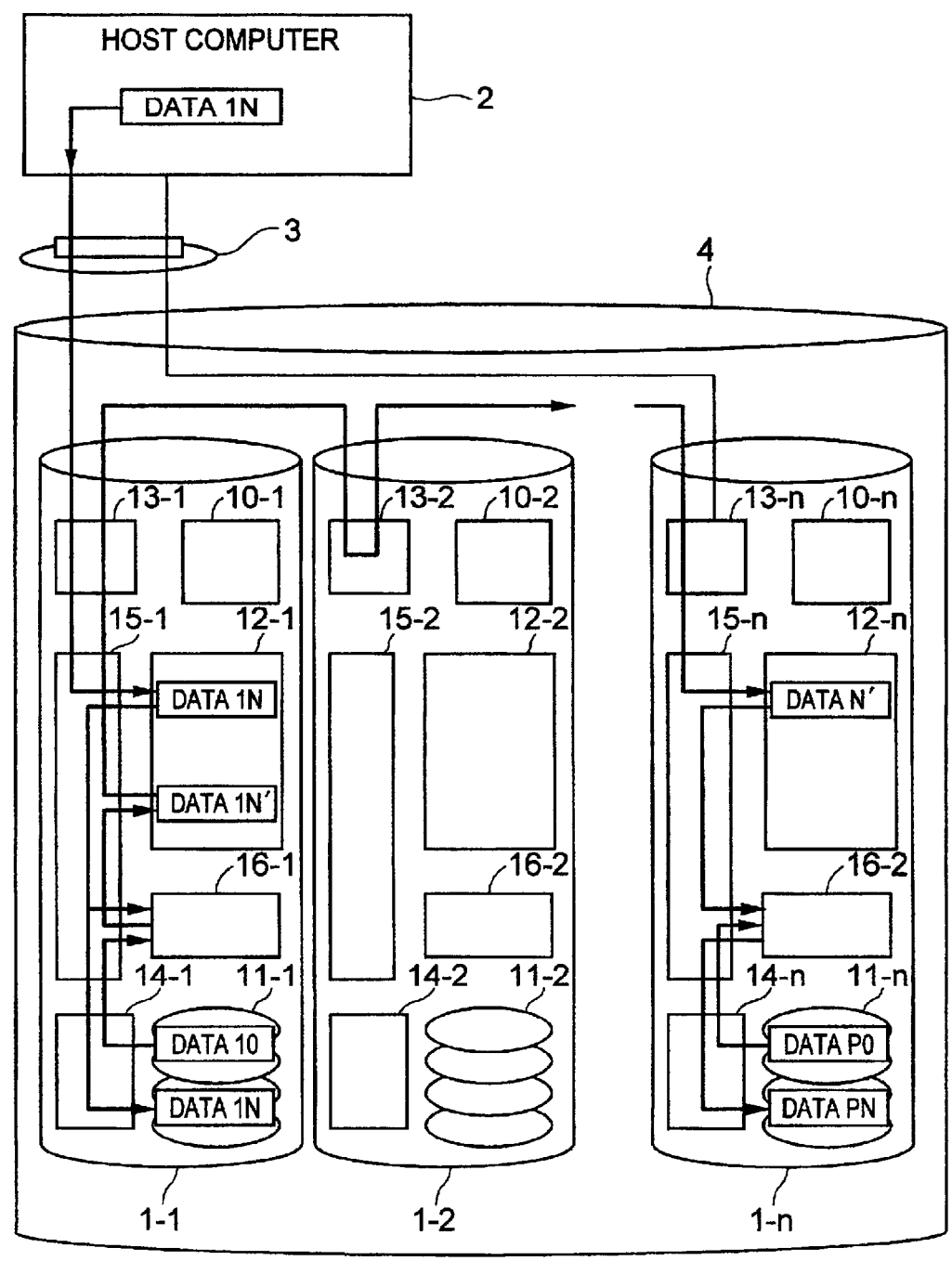
FIG. 30 is a diagram showing an example of the write data transfer processing (single) in the fourth embodiment of the present invention.

FIG. 30 is a diagram showing an example of data transfer processing in which the access request from the host computer 2 is a write data request and in which one storage device performs data update processing and another storage device performs redundant data update processing. In the figure, it is assumed that the storage device 1-1 performs data update processing (Data10→Data1N) and that the storage device 1-N performs redundant data update processing (Data0→DataPN).

As in the above description, each of storage devices 1-1 to 1-N checks if it should process the access request or if it should perform redundant data update processing associated with the access request based on the access request information stored in the received command storage unit 26 and the cooperation control information 29. A disk device, which has judged that it will not process the access request, deletes the access request and completes the write data request processing associated with the write data request.

The storage device 1-1, which has judged that it will perform data update processing, starts reading data to be updated (old data: Data10) from the disks 11-1 via the disk controller 14-1.

In addition, the storage device causes the update information generator 16-1 to execute, for example, the exclusive logical sum operation between the data (new data: Data1N) received from the host computer 2 via the interface controller 13-1 and the old data (Data10) to generate update information (Data1N').

In addition, the storage device replaces the new data (Data1N), received from the host computer 2, with the update information (Data1N') and transmits the data frame information. To this data frame information is added the Data Valid bit area where the flag corresponding to the segment in which the update information is to be stored has been set to "Valid".

The storage device 1-1 stores the new data (Data1N) into the disks 11-1 via the disk controller 14-1 to update the data.

In addition, the storage device 1-1 generates and transmits status information on the above processing and deletes the access request to complete a series of write data request processing.

The storage device 1-N, which has judged that it will update redundant data, starts reading update target redundant data (old redundant data: DataP0) from the disks 11-N via the disk controller 14-N.

In addition, the storage device causes the update information generator 16-N to execute, for example, the exclusive logical sum operation between the update information (Data1N') received from the storage device 1-1 and the old redundant data (DataP0) to generate new redundant data (DataPN). Then, the storage device stores the new redundant data (DataPN) on the disks 11-N via the disk controller 14-N to update the redundant data.

The storage device 1-N generates new status information based on the status information on the above processing and the status information received from the device in the previous stage, transmits the generated status information to the host computer 2, deletes the access request, and completes a series of read data request processing.

During redundant data update processing described above, the storage device checks if the corresponding flag in the Data Valid bit area is set to "Valid" and, only when it is set to "Valid", updates the redundant data. When the flag indicates "Invalid", the received data frame information is retransmitted to the device in the following stage. This allows data or redundant data to be updated even when a storage device that updates redundant data is followed a storage device that has data to be updated.

(2-4) Write Processing (Data Update Processing by Multiple Storage Devices)

Figure 31:
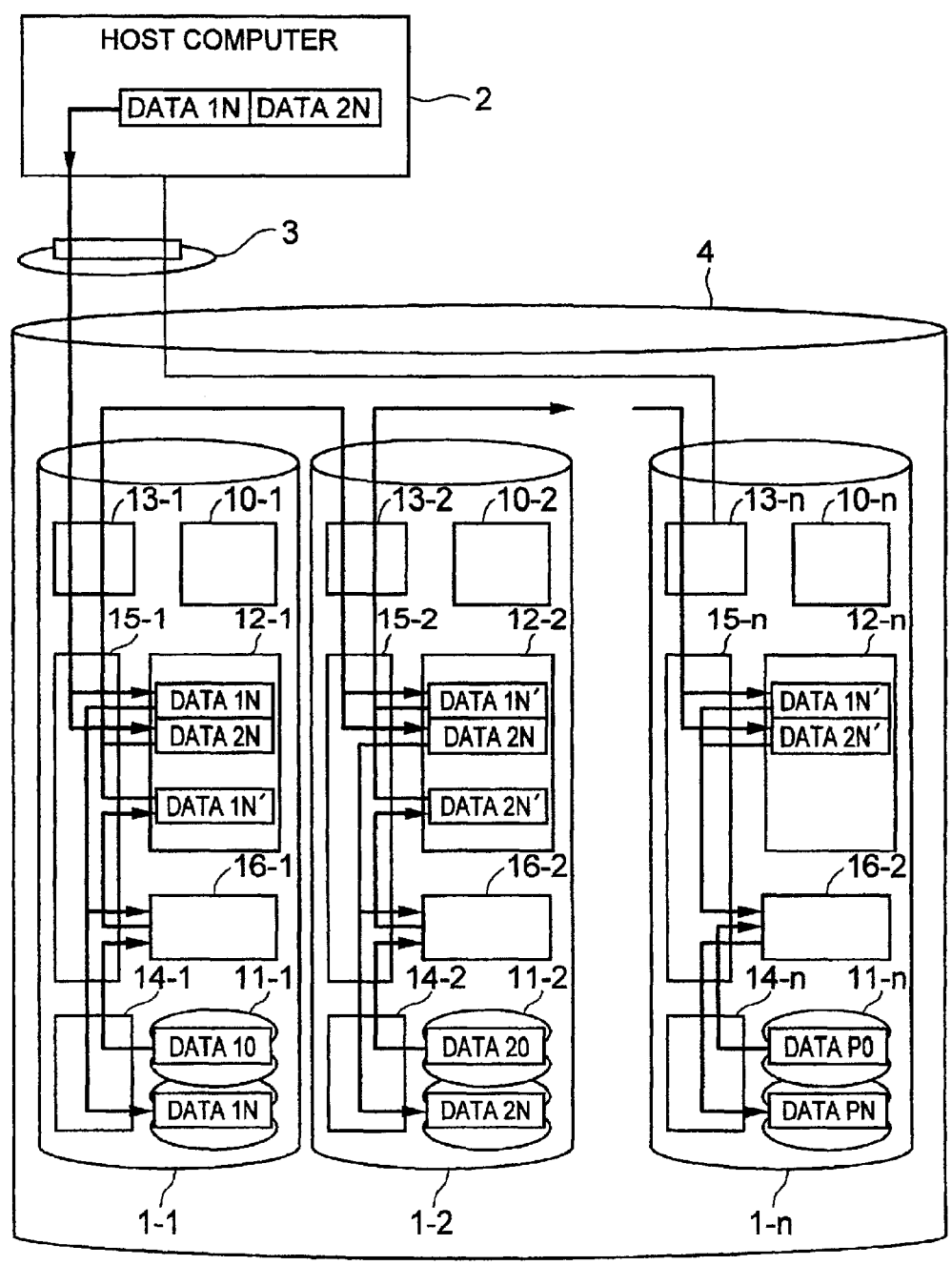
FIG. 31 is a diagram showing an example of the write data transfer processing (multiple) in the fourth embodiment of the present invention.

FIG. 31 is a diagram showing an example of data transfer processing in which the access request from the host computer 2 is a write data request and in which multiple storage devices perform data update processing and one storage device performs redundant data update processing. In the figure, it is assumed that the storage devices 1-1/2 perform data update processing (Data10→Data1N/2N) and that the storage device 1-N performs redundant data update processing (Data0→DataPN).

As in the above description, each of storage devices 1-1 to 1-N checks if it should process the access request and if it should perform redundant data update processing associated with the access request based on the access request information stored in the received command storage unit 26 and the cooperation control information 29. A disk device, which has judged that it will not process the access request, deletes the access request and completes the write data request processing associated with the write data request.

The storage device 1-1, which has judged that it will perform data update processing, starts reading data to be updated (old data: Data10) from the disks 11-1 via the disk controller 14-1.

In addition, the storage device causes the update information generator 16-1 to execute, for example, the exclusive logical sum operation between the its new data (Data1N), which is included in the data (New data: Data1N/2N) received from the host computer 2 via the interface controller 13-1, and the old data (Data10) to generate update information (Data1N').

In addition, the storage device replaces its new data (Data1N), which is included in the new data (Data1N/2N) received from the host computer 2, with the update information (Data1N') and transmits the data frame information. To this data frame information is added the Data Valid bit area where the flag corresponding to the segment in which the update information is to be stored has been set to "Valid" and the flags corresponding to other user data segments are set to "Invalid".

As in the above description, the storage device 1-1 updates the data, transmits the status information, and completes a series of write data request processing.

Also, the storage device 1-2, which has judged that it will perform data update processing, starts reading data to be updated (old data: Data20) from the disks 11-2 via the disk controller 14-2.

In addition, the storage device causes the update information generator 16-2 to execute, for example, the exclusive logical sum operation between the its new data (Data2N), which is included in the data (update information: Data1N', new data: Data2N) received from the storage device 1-1 in the previous stage via the interface controller 13-2, and the old data (Data20) to generate update information (Data2N').

In addition, the storage device replaces its new data (Data2N), which is included in the data (Data1N', Data2N) received from the storage device 1-1 in the previous stage, with the update information (Data2N') and transmits the data frame information in which the flag corresponding to the segment, in which the update information is to be stored, is set to "Valid".

As in the above description, the storage device updates the data, generates and transmits new status information from the status information received from the device in the previous stage and its status information, and deletes the access request to complete a series of write data request processing.

The storage device 1-N, which has judged that it will update redundant data, starts reading update target redundant data (old redundant data: DataP0) from the disks 11-N via the disk controller 14-N.

In addition, the storage device causes the update information generator 16-N to execute, for example, the exclusive logical sum operation between the update information (Data1N'/2N') received from the storage device 1-2 and the old redundant data (DataP0) to generate new redundant data (DataPN). Then, the storage device stores the new redundant data (DataPN) on the disks 11-N via the disk controller 14-N to update the redundant data.

The storage device 1-N generates new status information based on the status information on the above processing and the status information received from the storage devices 1-1/2 that performed the above data update processing, transmits the generated status information to the host computer 2, deletes the access request, and completes a series of read data request processing.

When updating the redundant data, the device performs processing based on the settings of the corresponding flags in the Data Valid bit area as described above.

Next, read data request processing and write data request processing, which have been described above, in the storage device 1 of the storage subsystem 4 will be described.

Figure 32:
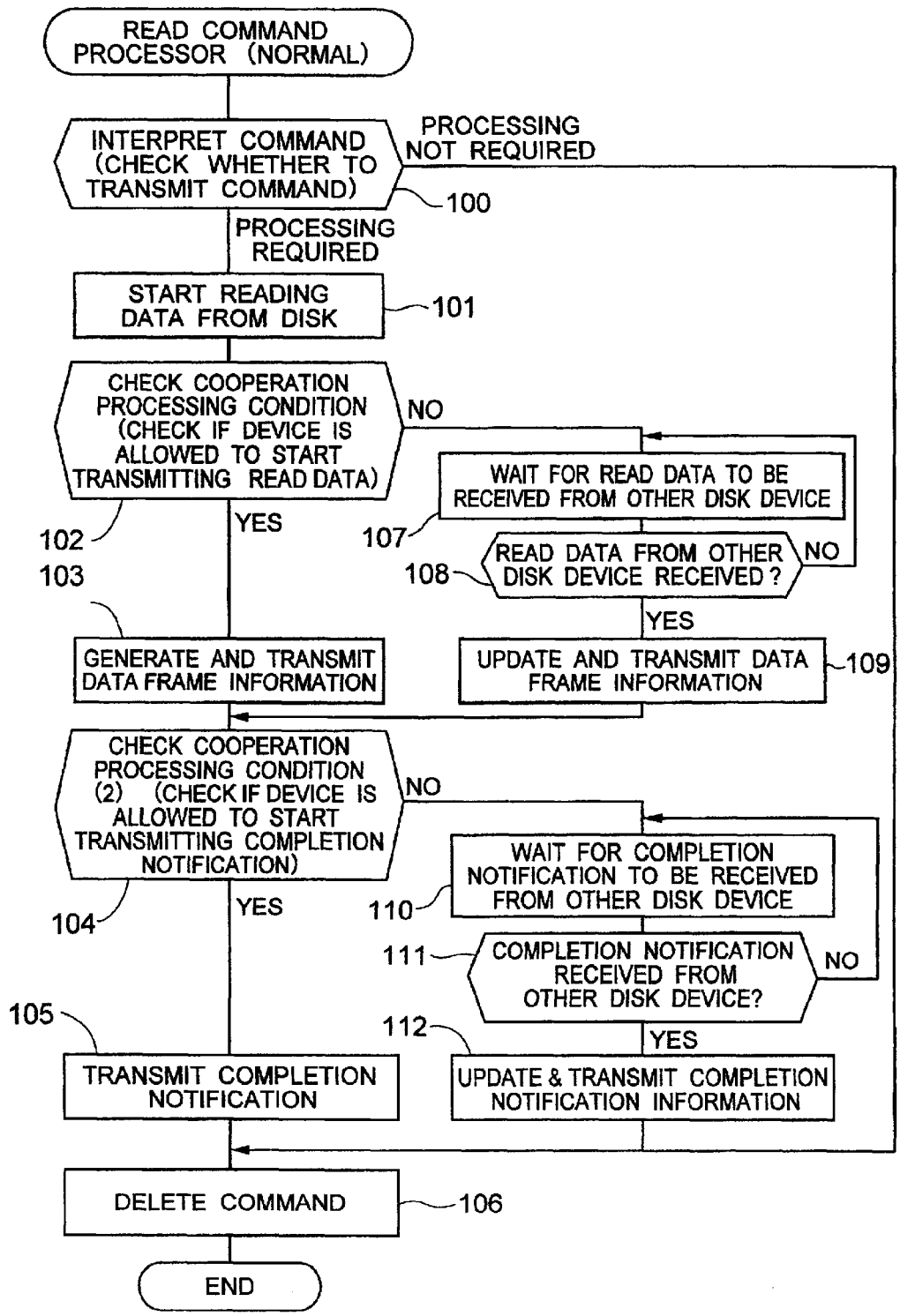
FIG. 32 is a diagram showing an example of the read processing flow in the fourth embodiment of the present invention.

FIG. 32 is a diagram showing an example of processing flow in the storage device 1 when a read data request is issued from the host computer 2.

The storage device 1 checks if it should process the access request (if it should transmit data) based on the cooperation control information 29 and on the access request information stored in the received command storage unit 26 (step 100).

The storage device 1, which has judged that it will not process the access request, executes the access request delete step (step 106) that will be described later, and completes processing for the read data request.

The storage device 1, which has judged that it will process the access request, starts reading data from the disk 11 into the transmission/reception data storage unit 27 of the buffer 12 via the disk controller 14 (step 101). In addition, the storage device checks if it is allowed to start transmitting the read data based on the cooperation control information 29 and the access request information (check if it is allowed to start transmitting read data) (step 102).

The storage device 1, which is allowed to start transmitting the read data, stores the read data in user data segment 0 and stores dummy data in other user data segments. In addition, the storage device generates the data frame information where the flag corresponding to user data segment 0 is set to "Valid" and the flags corresponding to other user data segments are set to "Invalid", and transmits it to the device in the following stage (step 103).

If only the storage device 1 is allowed to start transmitting the read data and there is no other storage device that processes the access request from the host computer 2 in the cooperation mode, the storage device 1 generates data frame information composed only of read data and transmits it to the host computer 2 without setting up, or adding information to, the flag information (Data Valid bit area).

On the other hand, the storage device 1, which is prohibited to start transmitting the read data, waits for the read data frame to be transmitted from the storage device in the previous stage (step 107). Upon receiving the read data frame (step 108), the storage device updates the received read data frame (stores its read data into the user data segment and sets the flag corresponding to the user data segment to "Valid") and transmits the updated read data frame (step 109).

The storage device 1, which is prohibited to start transmitting its read data and which stores its read data into the last segment of the user data segments, deletes the flag information (Data Valid bit area), generates data frame information composed only of read data, and transmits it to the host computer 2.

The storage device 1, which has judged that it will process the access request, checks if it is allowed to start transmitting an access request processing completion notification (check if it is allowed to transmit a completion notification) based on the cooperation control information 29 and on the access request information stored in the received command storage unit 26 (step 104).

The storage device 1, which is allowed to start transmitting a completion notification, generates status information on the read data processing and transmits it to the device in the following stage (step 105). In addition, after transmitting the status information, the storage device deletes the access request (step 106) and completes a series of read data request processing.

On the other hand, the storage device 1, which is prohibited to start transmitting a completion notification, waits for the status information to be received from the storage device in the previous stage (step 110). Upon receiving the status information (step 111), the storage device updates the status information (reflects its read data processing result), transmits the updated status information (step 112), deletes the access request (step 106), and completes a series of read data request processing.

In the above embodiment, whether or not read data is stored in user data segment 0 is used as a condition for checking if the storage device may start transmitting read data and, in addition, the storage device, which stores its read data into user data segment 0, generates the data frame information to which the flag information (Data Valid bit area) is added. However, the present invention is not limited to this method. Similarly, the storage device 1, which stores its read data into the last segment of the user data segments, deletes the flag information (Data Valid bit area) and generates data frame information composed of read data in the above description. However, the present invention is not limited to this method. Any algorithm may be used to select the storage device.

Figure 33:
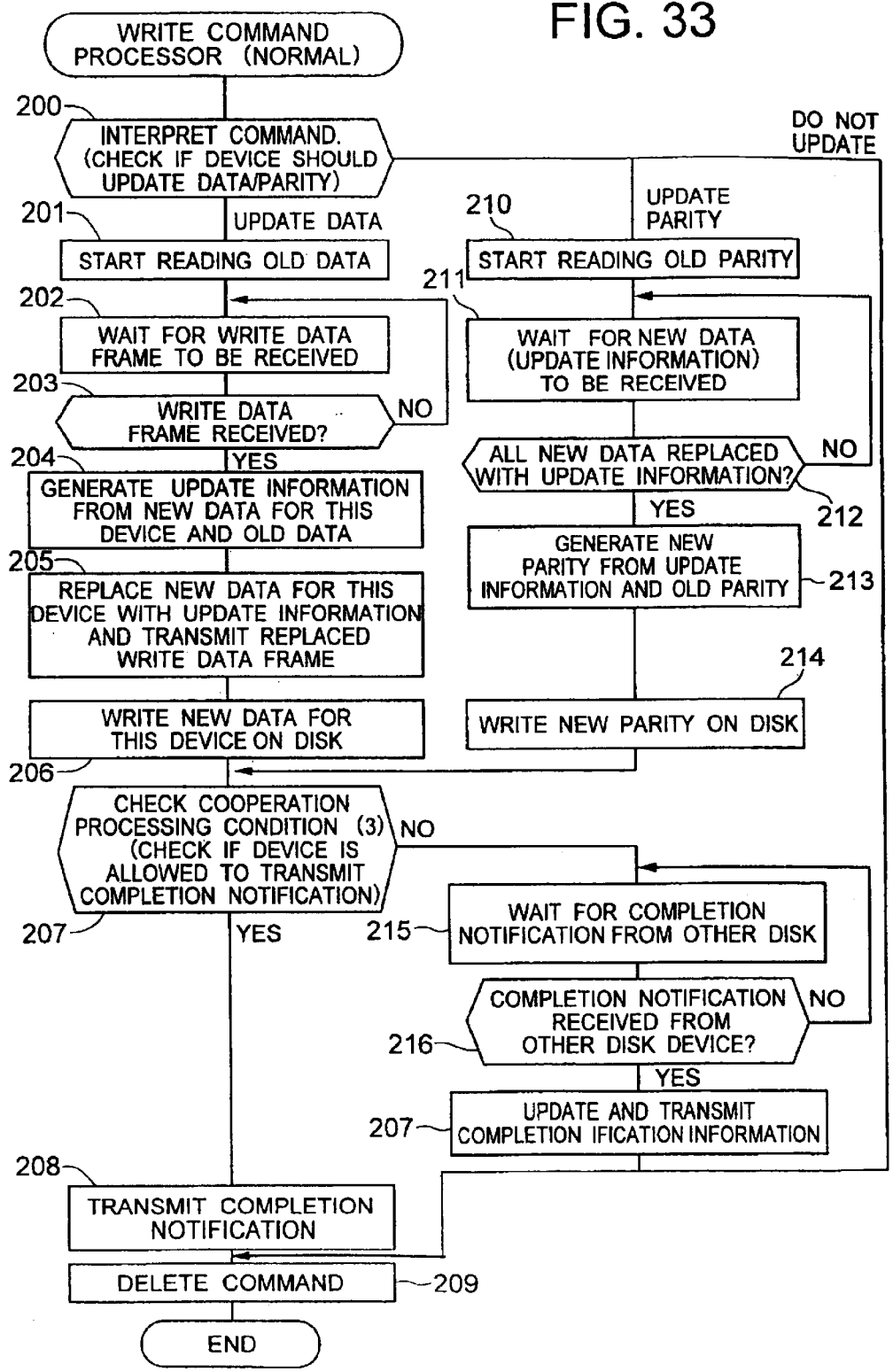
FIG. 33 is a diagram showing an example of the write processing flow in the fourth embodiment of the present invention.

FIG. 33 is a diagram showing an example of processing flow of the storage device 1 that receives a write data request from the host computer 2.

The storage device 1 checks if it should process the access request (update data) based on the cooperation control information 29 and on the access request information stored in the received command storage unit 26. In addition, the storage device checks if it should update redundant data associated with the access request (step 200).

The storage device 1, which has judged that it will not process the access request, executes the access request delete step (step 209) that will be described later, and completes processing for the write data request.

The storage device 1, which has judged that it will update data, starts reading data-to-be-updated (old data) from the disks 11 via the disk controller 14 (step 201).

In addition, the storage device waits for write data frame information to be received from the device in the previous stage (step 202). Upon receiving the write data frame information (step 203), the storage device causes the update information generator 16 to execute, for example, the exclusive logical sum operation between new data, which is included in write data (new data aggregate) included in the received write data frame information and which is to be stored by the storage device, and the old data to generate update information (step 204).

In addition, the storage device replaces the new data, which is included in the write data (new data aggregate) included in the received write data frame information and which is to be processed by the storage device, with the update information. The storage device then transmits the write data frame information in which the flag corresponding to the user data segment, where the update information is to be stored, is set to "Valid" (step 205).

If the received write data frame information does not include the flag information (Data Valid bit area), the storage device 1 generates write data frame information, in which the flag corresponding to the user data segment where its update information is to be stored is set to "Valid" and the flags corresponding to the other user data segments are set to "Invalid", and transmits the generated write data frame information.

In addition, the storage device stores the new data, which is to be stored by the storage device, on the disks 11 via the disk controller 14 (disk write) to update the write data (step 206).

The storage device 1, which has judged that it should update redundant data, starts reading redundant data (old redundant data) from the disks 11 via the disk controller 14 (step 210).

In addition, the storage device waits for the write data frame information to be received from the device in the previous stage (step 211). When the storage device finds that all the flag information (Data Valid bit area) corresponding to the user data segments included in the write data frame information is set to "Valid" (step 212), it causes the update information generator 16 to execute, for example, the exclusive logical sum operation between the update information (aggregate) included in the write data frame information and the old redundant data described above to generate new redundant data (step 213). Although the contents of all flag information are checked in the description above, the flag information satisfying a predetermined condition may also be used. The redundant data is updated by storing the new redundant data on the disks 11 via the disk controller 14 (step 214).

If all flag information corresponding to the user data segments included in the write data frame information is not set to "Valid", the received write data frame is retransmitted.

This method allows a storage device, which updates data, to generate and transmit update information even when that storage device is in a stage after the stage in which a storage device that updates redundant data exists.

A storage device, which receives the write data frame information again during this processing, retransmits it, for example, if the flag corresponding to the user data segment in which it is to store data is set to "Valid", based on the flag information included in the write data frame information.

The storage device 1, which has judged that it will update data or redundant data, checks if it is allowed to start transmitting a completion notification of access request processing (check if it is allowed to start transmitting a completion notification) based on the cooperation control information 29 and on the access request information stored in the received command storage unit 26 (step 207).

The storage device 1, which is allowed to start transmitting a completion notification, generates status information on the write data processing and transmits it to the device in the following stage. In addition, the storage device transmits the status information (step 208), deletes the access request (step 209), and completes a series of write data request processing.

On the other hand, the storage device 1, which is prohibited to start transmitting a completion notification, waits for the status information to be received from the storage device in the previous stage (step 215). Upon receiving the status information (step 216), the storage device updates the received status information (reflects its write data processing result), transmits the updated status information (step 217), deletes the access request (step 209), and completes a series of write data request processing.

In the above embodiment, because data is updated on all storage devices required to update data and, then, redundant data is updated, the storage device required to update redundant data generates and transmits the final status information. However, the present invention is not limited to this method. In addition, although each storage device updates status information to generate the final status information in the above description, the present invention is not limited to this method. For example, a particular storage device included in the storage subsystem 4 may manage the generation and transmission of the status information.

[Fifth Embodiment] (Fallback Operation)

A fifth embodiment of the present invention will be described with reference to FIGS. 34-36.

In the fifth embodiment, the additional operation status information on other storage devices, which cooperate with a storage device, is provided to allow the storage devices in the fourth embodiment to process access requests, transmitted from the host computer to the storage subsystem, even when a storage device of the storage subsystem fails.

FIG. 34 shows an example of redundant configuration management information in the cooperation control information 29 used in the description of the previous embodiment. In this information, "5" is set as "RAID level" information, and "3" and "1" are set as "No. of data disks" information and "No. of redundant data disks" information, respectively. In addition, the information includes "operation mode" information and "failing storage device ID" information (Failing storage device ID) with the fallback mode via storage device failure ID_2 specified.

The diagram of the storage device in this embodiment, similar to that of the storage device described above, is omitted.

In addition, when data restoration, which will be described later, is not necessary, the operation is controlled in the same way as in the embodiments described above and therefore its description is omitted.

The following describes the operation that is performed when a storage device 1-2 of the storage subsystem 4 fails and when the storage devices except the storage device 1-2 cooperate each other to process an access request transmitted from the host computer 2 to the storage subsystem 4.

(1) Read Processing for Failing Storage Device (Data Restoration by Multiple Storage Devices)

Figure 35:
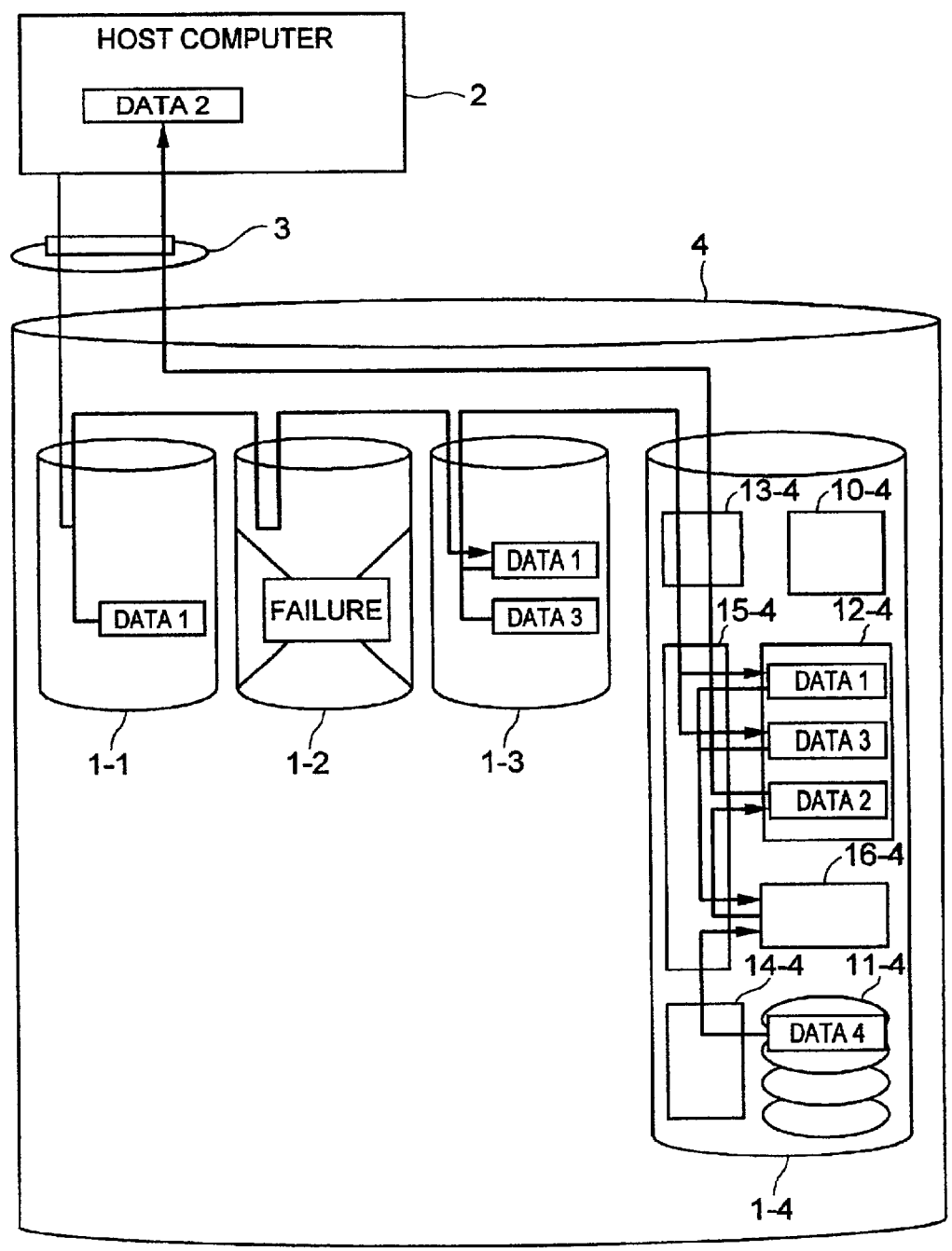
FIG. 35 is a diagram showing an example of the read data transfer processing (fallback) in the fifth embodiment of the present invention.

FIG. 35 is a diagram showing an example of how data is transferred when a storage device other than the storage device 1-2, which has failed, processes a read data request issued from the host computer 2 to the storage device 1-2.

When a storage device other than the storage device 1-2, which has stored the access request information in the received command storage unit 26, processes the access request based on the access request information and the cooperation control information 29, the storage device finds that it must restore data from the failing storage device 1-2 and checks if it should restore the data.

The storage device, which has judged that it must restore data from the failing storage device, starts reading data (Data1, Data3, and Data4 in the figure), required for data restoration, from the disks 11 via the disk controller 14 as necessary.

In the described below, the storage device in the first stage (that receives information from the host computer first) starts transmitting data associated with the data restoration processing based on the access request information and the cooperation control information 29, and the storage device in the last stage (that receives information from the host computer last) restores the data. However, the present invention is not limited to this method.

The storage device 1-1, which is allowed to start transmitting data associated with the data restoration processing, stores its data, for example, in user data segment 0 and transmits the data frame information. In this data frame information, the flag corresponding to user data segment 0 is set to "Valid" and the flags corresponding to the other user data segments are set to "Invalid". In addition, after generating and transmitting status information on the processing, the storage device deletes the access request and completes a series of read data request processing.

The storage device 1-3, which is prohibited to start transmitting data associated with the data restoration processing, adds user data segment 1, in which its data is stored, to the data frame information received from the storage device 1-1 and then generates/transmits data frame information in which the flag corresponding to user data segment 1 is set to "Valid". In addition, after generating and transmitting new status information based on the status information associated with the processing and the status information received from the device in the previous stage, the storage device deletes the access request and completes a series of read data request processing.

In addition, the storage device 1-4, which has judged that it will restore the data, causes the update information generator 16-4 to execute, for example, the exclusive logical sum operation between the data (Data1, Data3) received from the storage devices 1-1/3 and the data (Data4), stored by the storage device 1-4 itself and required for restoration, to restore data (Data2) stored in the failing storage device 1-2. Then, the storage device uses the restored data (Data2) to transmit the read data frame information to the host computer 2.

Preferably, the last-stage storage device that executes data restoration, that is, the storage device that generates the final data frame information to be transmitted to the host computer, deletes the flag (Data Valid bit) area indicating whether or not the data in the user data segments are valid and transmits a payload composed only of user data.

The status information is transmitted to the host computer 2 as follows. That is, the last-stage storage device that executes data transmission, that is, the storage device that generates the final data frame information to be transmitted to the host computer, generates new status information from the status information received from the device in the previous stage and its status information and transmits the generated status information to the host computer 2.

In the above embodiment, a storage device other that the storage device 1-2, which has failed, processes a read data request from the host computer 2 that is issued only to data stored in the storage device 1-2. However, the present invention is not limited to this case. For example, for a read data request for data stored on the storage devices 1-1/2, the storage device 1-4 uses the data (Data1) received from the storage device 1-1 and the data (Data2) restored by the storage device 1-4 to generate/transmit the final data frame information to the host computer.

(2) Write Processing for Failing Storage Device (Redundant Data Update by Multiple Storage Devices)

Figure 36:
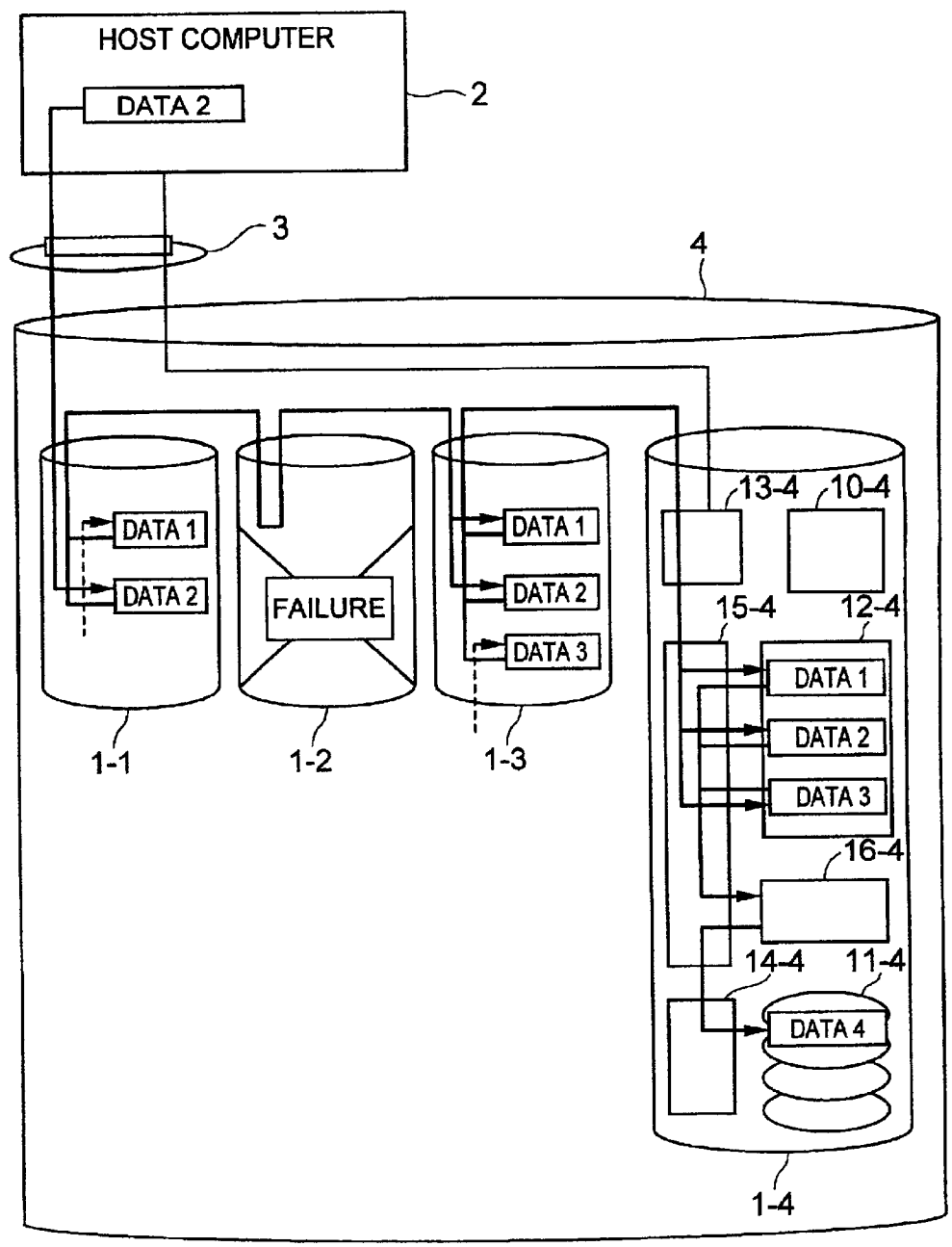
FIG. 36 is a diagram showing an example of the write data transfer processing (fallback) in the fifth embodiment of the present invention.

FIG. 36 is a diagram showing an example of how data is transferred when a storage device other than the storage device 1-2, which has failed, processes a write data request issued from the host computer 2 to the storage device 1-2.

A storage device other than the storage device 1-2, which has stored the access request information in the received command storage unit 26, checks if it should update data or if it should update redundant data associated with the access request, based on the access request information and the cooperation control information 29.

A storage device, which has judged that it will not update data or redundant data, starts reading data (Data1 and Data3 in the figure), stored on the disks 11 and required for updating redundant data, via the disk controller 14 as necessary.

Although it is assumed in the description below that the storage device in the first stage (that receives information from the host computer first) starts transmitting data associated with redundant data update processing and that the storage device in the last stage (that receives information from the host computer last) performs data restoration, the present invention is not limited to this case.

The storage device 1-1, which is allowed to start transmitting data associated with the redundant data update processing, stores its data (Data1) into user data segment 0 and new data (Data2), received from the host computer 2, into user data segment 1 and transmits the data frame information in which the flags corresponding to user data segments 0 and 1 are set to "Valid" and the flags corresponding to other user data segments are set to "Invalid". In addition, after generating and transmitting status information on the processing, the storage device deletes the access request to complete a series of write data request processing.

The storage device 1-3, which is prohibited to start transmitting data associated with the redundant data update processing, adds user data segment 2 in which its data (Data3) is stored to the data frame information received from the storage device 1-1 and generates/transmits data frame information in which the flag corresponding to user data segment 2 is set to "Valid". In addition, the storage device generates and transmits new status information based on the status information on the processing and the status information received from the device in the previous stage and deletes the access request to complete a series of write data request processing.

In addition, the storage device 1-4, which has judged that it will update the redundant data, causes the update information generator 16-4 to execute, for example, the exclusive logical sum operation on the data (Data1, Data2, Data3) finally received from the storage device 1-3 to generate new redundant data (DataP) and stores the generated redundant data (DataP) on the disks 11-4 via the disk controller 14-4 to update the redundant data.

Furthermore, the storage device 1-4 generates new status information based on the status information on the processing and the status information received from the device in the previous stage, transmits it to the host computer 2, and deletes the access request to complete a series of write data request processing.

When updating redundant data, the storage device checks if the corresponding flag in the Data Valid bit area is set to "Valid". The storage device updates the redundant data only when the flag is set to "Valid"; when it is still "Invalid", the storage device retransmits the received data frame information to the device in the following stage. This allows redundant data to be updated, for example, even if the stage of a storage device that updates data follows the stage of a storage device that updates redundant data.

In the above embodiment, a storage device other that the storage device 1-2, which has failed, processes a write data request from the host computer 2 that is issued only to data stored in the storage device 1-2. However, the present invention is not limited to this case. For example, for a write data request for data stored on the storage devices 1-1/2, the storage device 1-1 does not read data from the disks but stores new data (Data1), which is included in new data (Data1, Data2) received from the host computer 2 and which is its own data, on the disks 11-1 via the disk controller 14-1 to update data and then stores the new data (Data1, Data2) received from the host computer 2 in user data segments 0 and 1. In addition, the storage device transmits the data frame information in which the flags corresponding to user data segments 0 and 1 are set to "Valid" and the flags corresponding to other user data segments are set to "Invalid", generates and transmits the status information on the processing, and deletes the access request to complete a series of write data request processing.

Preferably, the cooperation control information 29 may be set by the host computer and its operation mode may be set by the user.

[Sixth Embodiment] (Multi-Path Control)

A sixth embodiment of the present invention will be described with reference to FIGS. 37 and 38.

In the sixth embodiment, the storage device in the embodiments described above further comprises a plurality of interface controllers to allow access request information from the host computer and user data transferred among the storage devices of the storage subsystem to be transferred via separate interfaces (transmission lines).

Figure 37:
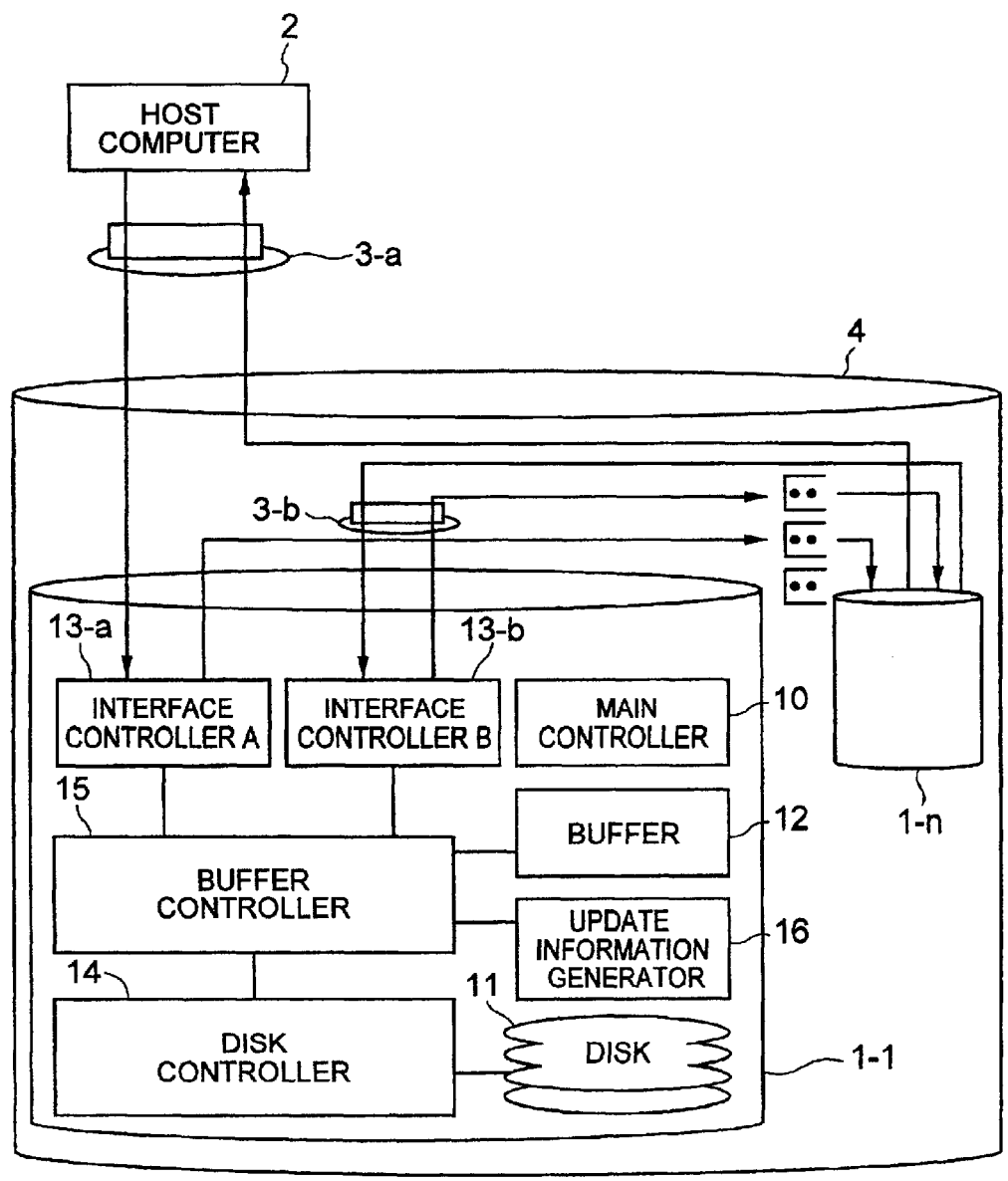
FIG. 37 is a diagram showing an example of a data processing system in a sixth embodiment of the present invention.

FIG. 37 is a diagram showing an example of a data processing system comprising a storage subsystem 4 composed of a plurality (N: N> 1) of storage devices 1 and a host computer 2.

In the figure, each storage device 1 of the storage subsystem 4 has a plurality of interface controllers A/B (13-a/b). As in the embodiments described above, the storage device uses the interface controller A 13-a to connect directly to the host computer 2 via the loop interface 3-a. At the same time, the storage devices 1 of the storage subsystem 4, each of which uses the interface controller B 13-b, are connected via a loop interface 3-b.

Although only the storage devices 1 of the storage subsystem 4, each of which uses the interface controller B 13-b, are connected via the loop interface 3-b in the example of the data processing system described above, the present invention is not limited to this configuration as will be described later.

The following describes an example of the operation of this embodiment in which the storage device 1-2 of the storage subsystem 4 has failed and in which the storage devices other than the storage device 1-2 cooperate each other to process a read data request issued from the host computer 2 to data stored on the failing storage device 1-2.

Figure 38:
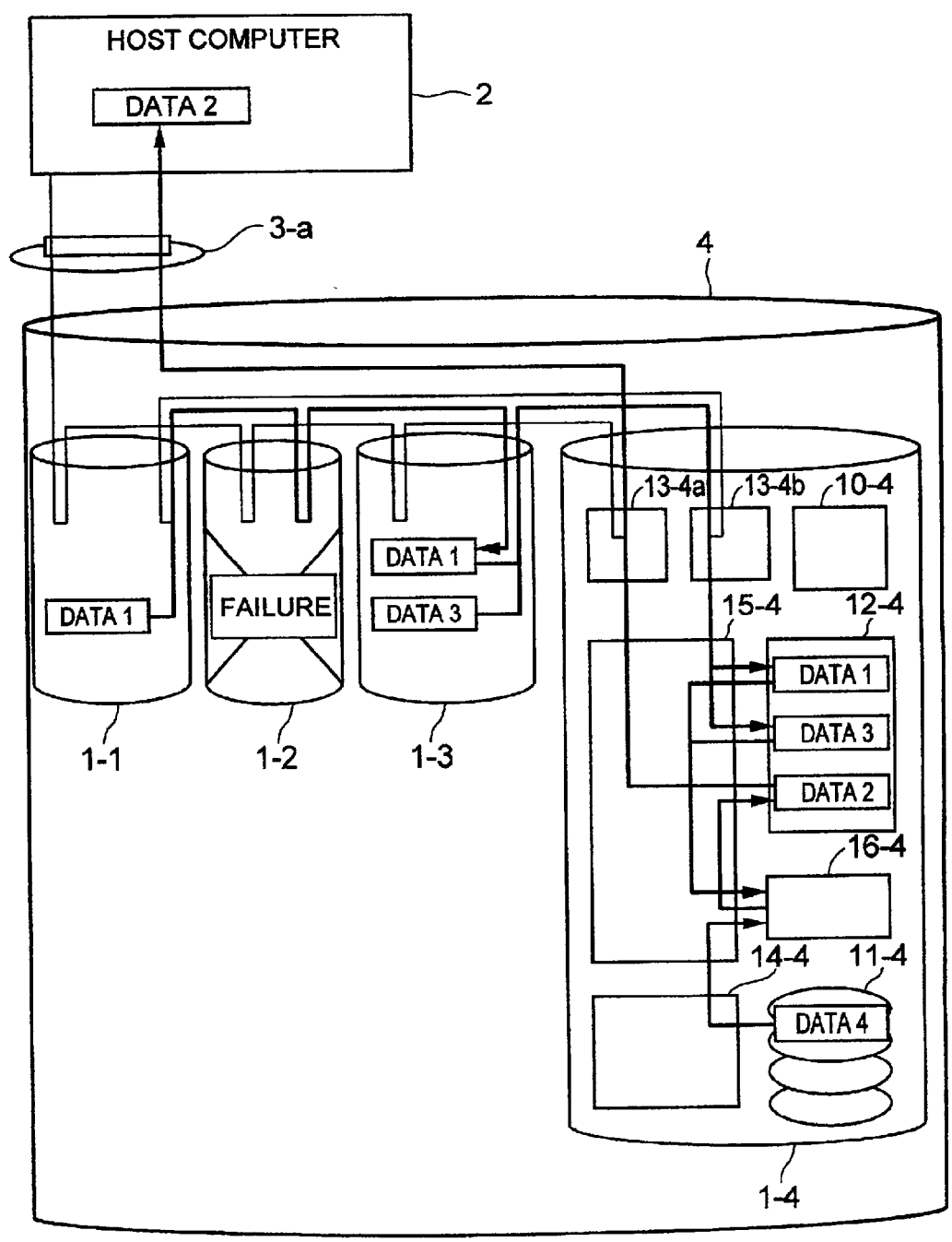
FIG. 38 is a diagram showing an example of the read data transfer processing (fallback) in the sixth embodiment of the present invention.

FIG. 38 is a diagram showing an example of data transfer in which a storage device other than the storage device 1-2, which has failed, processes a read data request issued from the host computer 2 to data stored on the device 1-2.

When a storage device other than the storage device 1-2, which has stored the access request in the received command storage unit 26 via the interface controller A 13-a, processes the access request based on the access request information and the cooperation control information 29 as in the above embodiments, data stored on the failing storage device 1-2 must be restored and checks if it must restore the data.

The storage device, which has judged that data stored on the failing storage device must be restored, starts reading data (Data1, Data3, Data4 in the figure), required for data restoration, from the disks 11 via the disk controller 14 as necessary.

The storage device 1-1, which is allowed to start transmitting data associated with the data restoration processing, stores its data (Data1), for example, in user data segment 0 and transmits the data frame information, in which the flag corresponding to user data segment 0 is set to "Valid" and the flags corresponding to other user data segments are set to "Invalid", using interface controller B that is different from interface controller A via which the access request information was received. In addition, the storage device generates and transmits the status information on the processing and deletes the access request to complete a series of read data request processing.

The storage device 1-3, which is prohibited to start transmitting data associated with the data restoration processing, adds user data segment 1, in which its data is stored, to the data frame information received from the storage device 1-1 and generates/transmits data frame information in which the flag corresponding to user data segment 1 is set to "Valid". In addition, the storage device generates and transmits new status information, based on the status information on the processing and the status information received from the device in the previous stage, in the same way as the storage device 1-1 using interface controller B that is different from interface controller A via which the access request information was received and then deletes the access request to complete a series of read data request processing.

In addition, the storage device 1-4, which has judged that it will restore the data, causes the update information generator 16-4 to execute, for example, the exclusive logical sum operation between the data (Data1, Data3) received from the storage devices 1-1/3 via the interface controller B 13-4b and data (Data4) stored on it and required for the data restoration processing to restore data (Data2) stored on the failing storage device 1-2. Furthermore, the storage device transmits the restored data (Data2) by transmitting the read data frame information to the host computer 2 using the interface controller A 13-4a.

Although not described in detail, data may also be transferred during write data processing among the storage devices of the storage subsystem using an interface that is different from the interface via which an access request information was received from the host computer.

Although, in the above description, data is transferred among the cooperating storage devices of the storage subsystem using an interface different from the interface via which access request information was received from the host computer, the present invention is not limited to this case. For example, an interface may be selected via which data is transferred among storage devices that perform cooperation processing based on the operating status of the interface. There is no problem as long as the host computer 2 is connected to an interface via which data is transferred.

The embodiments described above have the effects described below.

In the first embodiment of the present invention, each storage device of the storage subsystem composed of a plurality of storage devices comprises means for allowing the plurality of storage devices to share an access request transmitted from a host computer to the storage subsystem, means for checking if the storage device should process the shared access request, and means for transferring write data, transmitted from the host computer to the storage subsystem, to a storage device that has judged that it will process the data. This makes it possible a storage subsystem that eliminates the need for a controller controlling the individual storage devices and that ensures optimum storage device usage efficiency.

In the second embodiment of the present invention, at least one storage device of a storage subsystem composed of a plurality of storage devices comprises means for receiving an access request transmitted from the host computer to the storage subsystem and for determining a storage device that should process the access request and, as necessary, transferring the access request transmitted from the host computer to the storage subsystem to the storage device that should process the access request. This makes it possible a storage subsystem that eliminates the need for a controller controlling the individual storage devices and that ensures optimum storage device usage efficiency.

In the third embodiment of the present invention, each storage device of a storage subsystem composed of a plurality of storage devices at least comprises means for sharing a write data request transmitted from the host computer to the storage subsystem and means for synchronizing write data transfer processing and status information transmission processing for the shared write data request between a pair of multiple storage devices. This makes it possible a storage subsystem that eliminates the need for a controller controlling the individual storage devices and that reduces the load of the interface.

It should be further understood by those skilled in the art that the foregoing description has been made on embodiments of the invention and that various changes and modifications may be made in the invention without departing from the spirit of the invention and the scope of the appended claims.

What is claimed is:

1. A storage subsystem comprising a plurality of storage devices connected to a host computer, wherein
   a first storage device included in said plurality of storage devices comprises:
   means for receiving a request for information processing for said storage subsystem, said information processing being executed in said host computer;
   means for transferring the received request to a second storage device included in said plurality of storage devices; and
   means for executing information processing indicated by the received request when the received request should be executed by said first storage device based on cooperation control information which indicates a the request to be executed by the first storage device,
   wherein each of the plurality of storage devices control RAID level cooperatively,
   said second storage device comprises:
   means for receiving the transferred request; and
   means for executing information processing indicated by the transferred request when the transferred request should be executed by said second storage device based on the cooperation control information which indicates a request to be executed by said second storage
   wherein the first and second storage device control RAID level 4 or 5,
   wherein, if the request is a data write request, the first storage device receives data connection with the data write request, stores the data, makes another data to be used for making parity data in the second storage device and sends the another data to the second storage device,
   wherein the second storage device receives the another data, makes parity data based on the another data, and stores the parity data,
   wherein in said first storage device, said means for transferring a request adds information, which indicates said first storage device, to the request to be transferred, and
   wherein said second storage device further comprises means for suppressing another transfer of the transferred request based on the added information that indicates said first storage device.

2. A storage subsystem comprising a plurality of storage devices connected to a host computer, wherein
   a first storage device included in said plurality of storage devices comprises:
   a receiver connected to the host computer, for receiving a request for information processing for said storage subsystem;
   a transceiver connected to said receiver and a second storage device included in the plurality of storage devices, for transferring the received request to the second storage device; and
   a processor for executing the information processing indicated by the received request when the received request should be excuted by said first storage device based on cooperation control information which indicates the request to be executed by the first storage device,
   wherein each of the plurality of storage devices control RAID level cooperatively;
   a third storage device included in the plurality of the storage devices which is connected to the second storage device, wherein
   said third storage device comprises:
   a second receiver connected to said transceiver for receiving the transferred request; and
   a second processor connected to said second receiver for executing the information processing indicated by the transferred request when the transferred request should be executed by said third storage device based on the cooperation control information which indicates a request to be executed,
   wherein the first, second and third storage devices control RAID level 4 or 5,
   wherein if the request is a data write request and the second storage device fails, the first storage device receives data connection with the data write request, stores the data, makes another data to be used for making parity data in the third storage device and sends the another data to the third storage device,
   wherein the third storage device receives the another data, makes parity data based on the another data, and stores the parity data,
   wherein in said first storage device, said transceiver adds information, which indicates said first storage device, to the request to be transferred, and
   wherein said second processor suppresses another transfer of the transferred request based on the added information that indicates said first storage device.

3. A storage control method which uses a storage subsystem comprising a plurality of storage devices connected to a host computer and includes a first storage device, wherein
   said first storage device executes:
   a step of receiving a request for information processing for said storage subsystem, said information processing being executed in said host computer;
   a step of transferring the received request to a second storage device included in said plurality of storage devices; and
   a step of executing information processing indicated by the received request when the received request should be executed by said first storage device based on cooperation control information which indicates a request to be executed by the first storage device,
   wherein each of the plurality of storage devices control RAID level cooperatively,
   said second storage device executes:
   a step of receiving the transferred request; and
   a step of executing information processing indicated by the transferred request when the transferred request should be executed by said second storage device based on the cooperation control information which indicates a request to be executed by said second storage device, wherein the first and second storage device control RAID level 4 or 5, wherein, if the request is a data write request, the first storage device receives data connection with the data write request, stores the data, makes another data to be used for making parity data in the second storage device and sends the another data to be second storage device, wherein the second storage device received the another data, makes parity data based on the another data, and stores the parity data, wherein in said first storage device, said step of transferring a request adds information, which indicates said first storage device, to the request to be transferred, and wherein said second storage device further executes a step of suppressing another transfer of the transferred request based on the added information that indicates said first storage device.

4. A storage subsystem comprising a plurality of storage devices connected to a host computer, wherein:

a first storage device included in said plurality of storage devices comprises:

means for receiving a request for information processing for said storage subsystem, said information processing being executed in said host computer;

means for transferring the received request to a second storage device included in said plurality of storage devices;

means for executing information processing indicated by the received request when the received request should be executed by said first storage device;

said second storage device comprises:

means for receiving the transferred request; and means for executing information processing indicated by the transferred request when the transferred request should be executed by said second storage device;

in said first storage device, said means for transferring a request adds information, which indicates said first storage device, to the request to be transferred; and said second storage device further comprises means for suppressing another transfer of the transferred request based on the added information that indicates said first storage device.

5. A storage subsystem comprising a plurality of storage devices connected to a host computer, wherein:

a first storage device included in said plurality of storage devices comprises:

a receiver connected to the host computer, for receiving a request for information processing for said storage subsystem, said information processing being executed in said host computer;

a transceiver connected to said receiver and a second storage device included in the plurality of storage devices, for transferring the received request to the second storage device; and a processor for executing the information processing indicated by the received request when the received request should be executed by said first storage device;

said second storage device comprises:

a second receiver connected to said transceiver for receiving the transferred request; and a second processor connected to said second receiver for executing the information processing indicated by the transferred request when the transferred request should be executed by said second storage device;

in said first storage device, said transceiver adds information, which indicates said first storage device, to the request to be transferred; and said second processor suppresses another transfer of the transferred request based on the added information that indicates said first storage device.

6. A storage control method wide uses a storage subsystem comprising a plurality of storage devices connected to a host computer and include a firs storage device, wherein said first storage device executes:

a step of receiving a request for information processing for said storage subsystem, said information processing being executed in said host computer;

a step of transferring the received request to a second storage device included in said plurality of storage devices; and a step of executing information processing indicated by the received request when the received request should be executed by said first storage device;

said second storage device executes:

a step of receiving the transferred request; and a step of executing information processing indicated by the transferred request when the transferred request should be executed by said second storage device;

in said first storage device, said step of transferring a request adds information, which indicates said first storage device, to the request to be transferred; and said second storage device further executes a step of suppressing another transfer of the transferred request based on the added information that indicates said first storage device.

* * * * *